United States Patent
Mukaiyama

(10) Patent No.: US 7,133,768 B2
(45) Date of Patent: Nov. 7, 2006

(54) VEHICULAR DRIVING SUPPORT SYSTEM AND VEHICULAR CONTROL SYSTEM

(75) Inventor: Yoshio Mukaiyama, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 330 days.

(21) Appl. No.: 10/770,419

(22) Filed: Feb. 4, 2004

(65) Prior Publication Data

US 2004/0158390 A1    Aug. 12, 2004

(30) Foreign Application Priority Data

Feb. 12, 2003  (JP) ............................. 2003-033495

(51) Int. Cl.
*G01C 21/26* (2006.01)
*G01C 21/28* (2006.01)

(52) U.S. Cl. ............... 701/200; 701/301; 701/114; 340/901; 340/902; 340/903; 340/435

(58) Field of Classification Search ............ 701/200, 701/300, 301, 117, 33; 340/901, 902, 903, 340/905, 435, 436
See application file for complete search history.

(56) References Cited

U.S. PATENT DOCUMENTS

| | | | |
|---|---|---|---|
| 6,292,109 B1* | 9/2001 | Murano et al. ............. 340/903 |
| 6,615,137 B1* | 9/2003 | Lutter et al. ............... 701/301 |
| 6,625,540 B1* | 9/2003 | Kageyama ................. 701/301 |
| 6,662,108 B1* | 12/2003 | Miller et al. ............... 701/301 |
| 6,768,944 B1* | 7/2004 | Breed et al. ............... 701/301 |
| 6,856,896 B1* | 2/2005 | Kushida et al. ............ 701/207 |
| 2004/0128062 A1* | 7/2004 | Ogino et al. .............. 701/200 |

FOREIGN PATENT DOCUMENTS

| JP | A 4-290200 | 10/1992 |
|---|---|---|
| JP | A 11-352241 | 12/1999 |
| JP | A 2000-348299 | 12/2000 |
| JP | A 2000-357298 | 12/2000 |

\* cited by examiner

*Primary Examiner*—Thomas Black
*Assistant Examiner*—Brian J. Broadhead
(74) *Attorney, Agent, or Firm*—Kenyon & Kenyon LLP

(57) ABSTRACT

A driving support system for a vehicle, which is provided with a communication apparatus capable of bi-directional communication between the vehicle and an unspecified number of moving objects, detects the presence of a communication impeding intersection at which there is a radio-wave blocking object using information obtained by communication with at least one of the moving objects that is traveling on an intersecting road which intersects the road on which the vehicle is traveling. The driving support system then transmits to at least one of the moving objects on the road on which the vehicle is traveling at least one of communication impeding intersection information relating to the communication impeding intersection and moving object information relating to at least one of the moving objects that is on the intersecting road only when the presence of the communication impeding intersection has been detected.

21 Claims, 8 Drawing Sheets

| 1 | ID CODE(IP ADDRESS,ETC) |
|---|---|
| 2 | POSITIONAL INFORMATION |
| 3 | VEHICLE TYPE CODE |

| a | TRANSMISSION TARGET ID CODE |
| b | COMMUNICATION IMPEDING INTERSECTION INFORMATION |
| c | ADDITIONAL INFORMATION,ETC. |

VEHICULAR DRIVING SUPPORT SYSTEM AND VEHICULAR CONTROL SYSTEM

INCORPORATION BY REFERENCE

The disclosure of Japanese Patent Application No. 2003-033495 filed on Feb. 12, 2003, including the specification, drawings and abstract is incorporated herein by reference in its entirety.

BACKGROUND OF THE INVENTION

1. Field of the Invention

The invention relates to a vehicular driving support system and vehicular control system is provided with a communication apparatus enabling bi-directional communication between moving objects. More specifically, the invention relates to a vehicular driving support system which uses vehicle-to-vehicle communication to support, with an efficient volume of information, safe driving at intersections at which there is a concentration of objects, such as buildings, which block the transmission of radio-waves, and a vehicular control system which uses the information obtained from the vehicular driving support system.

2. Description of the Related Art

Vehicle control is able to be performed which supports safe driving based on information gathered using, for example, various sensors mounted on the vehicle and radar equipment mounted on the vehicle which detect obstacles around the vehicle. Further, various information, such as that related to traffic congestion, is able to be provided to a running vehicle by communication between roadside equipment located near a road and an on-board device mounted in the vehicle (i.e., roadside-vehicle communication).

Recently, bi-directional communication between vehicles (herein referred to as "vehicle-to-vehicle communication") has been proposed, wherein it is conceivable to perform control to prevent accidents from occurring by having vehicles exchange information and proceed in coordination with one another. With this bi-directional communication it is also conceivable to indirectly obtain information provided by roadside equipment (such as a sensor that detects the degree of traffic congestion around the vehicle) without direct roadside-vehicle communication by having one vehicle relay information obtained from the roadside equipment to another vehicle.

JP(A) 4-290200 discloses technology using this kind of vehicle-to-vehicle communication. According to this publication, a vehicular warning apparatus is known which estimates the probability of a collision with an intersecting vehicle when crossing an intersection based on information relating to the current position, running speed, and direction of travel of the intersecting vehicle obtained by vehicle-to-vehicle communication, and outputting a warning when necessary in order to prevent a collision with the intersecting vehicle at the intersection.

In the vehicle-to-vehicle communication, both vehicles are provided with a radio transceiver which both transmits a radio signal that includes information relating to the host vehicle and receives a radio signal that includes information relating to the other vehicle. This vehicle-to-vehicle communication is typically between one vehicle and one or more other vehicles. As a result, when there is a concentration of vehicles, it may become difficult for each vehicle to efficiently extract the necessary other vehicle information. Further, the amount of information to be processed increases, thus increasing the processing load.

Therefore, when vehicle-to-vehicle communication is taking place between a vehicle and an unspecified number of other vehicles, or more specifically, at a location where there is a concentration of a plurality of vehicles, such as at an intersection, the processing load on the receiving side increases so time is required to extract the necessary information. As a result, the output timing of a warning to prevent a collision with an intersecting vehicle is delayed, which may reduce the functionality of the vehicle-to-vehicle communication at a place where vehicle-to-vehicle communication is extremely important.

Moreover, some areas may have a concentration of objects, such as buildings, that block the transmission of radio-waves. In this case, because radio-waves in the high frequency band used in vehicle-to-vehicle communication theoretically do not diffract, vehicle-to-vehicle communication between vehicles (e.g., vehicles which will meet at an intersection) providing important information may be impeded when there are radio-wave blocking objects present. On the other hand, it is possible to use information obtained indirectly via vehicle-to-vehicle communication with another vehicle. However, near intersections where there is a concentration of vehicles, it is still difficult to extract and apply the information quickly, as described above. Also in this case, even at intersections where there are actually no radio-wave blocking objects that impede vehicle-to-vehicle communication, the processing load on the receiving side still increases due to the indirect information provided by the other vehicle.

SUMMARY OF THE INVENTION

In view of the foregoing problems, this invention thus provides a vehicular driving support system which can provide necessary information in an efficient volume and increase the usability of bi-directional communication without increasing the load on the receiving side at an intersection, particularly an intersection with a concentration of radio-wave blocking objects, and a vehicular control system that uses the information obtained from the vehicular driving support system.

A first aspect of the invention relates to a driving support system for a vehicle, which includes a communication apparatus and a detection device. The communication apparatus enables bi-directional communication between a first vehicle and an unspecified number of moving objects, said communication apparatus obtaining at least one of i) communication impeding intersection information relating to a communication impeding intersection at which there is a radio-wave blocking object that blocks radio waves, and ii) moving object information relating to at least one of first moving objects which is on an intersecting road that intersects a road on which the first vehicle is traveling, by communication between the first vehicle and a first moving object, from among the unspecified number of moving objects, which is traveling on the intersecting road. The communication apparatus transmits to a second moving object, from among the unspecified number of moving objects, at least one of the communication impeding intersection information and the moving object information. The detection device detects the presence of the communication impeding intersection using at least one of the communication impeding intersection information and the moving object information. The communication apparatus transmits to the second moving object on the road on which the first vehicle is traveling at least one of the communication impeding intersection information and the moving object information only when the presence of the communication impeding intersection has been detected.

According to this configuration, bi-directional communication between the first vehicle and the unspecified number of moving objects (including people and bicycles and the like) is achieved with the communication apparatus mounted on the first vehicle (herein, also referred to as "host vehicle"). At a communication impeding intersection around which there is a radio-wave blocking object such as a building (e.g., an intersection with poor visibility), communication with a first moving object, from among the unspecified number of moving objects, which is traveling on the a road that intersects the road on which the host vehicle is traveling may be impeded by the effect from the radio-wave blocking object.

In this case, communication with the first moving object may start suddenly at a spot where communication is no longer effected by the radio-wave blocking object (such as a spot near or just before the communication impeding intersection). Therefore, when the first vehicle attempts to obtain moving object information (such as the vehicle speed and position) relating to the first moving object indirectly from the second moving object on the road, for example, it is necessary for the first vehicle to receive this information a sufficient distance before the communication impeding intersection in order to pass through it safely. On the other hand, at an intersection where there are no radio-wave blocking objects, there is no effect on the radio-waves so communication with the first moving object starts a sufficient distance before the intersection. In this case therefore, it is not necessary to receive the moving object information (such as the vehicle speed and position) relating to the first moving object indirectly from the second moving object.

According to this aspect of the invention, at least one of the communication impeding intersection information relating to the communication impeding intersection and the moving object information relating to the first moving object is transmitted to the second moving object only when a communication impeding intersection is detected, taking into account a processing load on the receiving side that receives the information provided. Therefore, useful information is able to be provided to the second moving object (i.e., the receiving side) only when necessary so an efficient volume of information can be provided at communication impeding intersections where bi-directional communication is extremely important, without increasing the processing load on the receiving side. As a result, it is possible to effectively support safe driving at communication impeding intersections. Also, when the directionality of the transmitting/receiving antenna is non-variable (i.e., omni-directional), data including the communication impeding intersection information is transmitted to the unspecified number of moving objects. Even in this case, through, the processing load on the receiving side does not increase because the receiving side can easily determine whether the transmitted information was intended for them due to an ID code for the second moving object, which is the first vehicle targeted to receive the information, being included in the data.

The detection device may also be designed to detect the presence of the communication impeding intersection based on a communication history between the first vehicle and the first moving object. That is, at the communication impeding intersection, communication between the first vehicle and the first moving object suddenly starts at a spot where communication is no longer effected by the radio-wave blocking object (such as a spot near or just before the communication impeding intersection). Accordingly, it is possible to determine whether the intersection ahead is a communication impeding intersection by calculating the position of the first vehicle at the time communication with the first moving object starts based on the communication history with the first moving object, and evaluating the distance between the first vehicle and the intersection ahead (e.g., the distance until guidance is possible using intersection information in predetermined map data and information from another moving object).

The detection device may also be designed to detect the presence of the communication impeding intersection when communication between the first vehicle and the first moving object, which is within a predetermined distance from the first vehicle, starts while communication between the first vehicle and only the second moving object is taking place. That is, at a communication impeding intersection, communication continues between the first vehicle and the second moving object only, due to interference from the radio-wave blocking object, and communication between the first vehicle and the first moving object starts at the point where there is no longer any interference from the radio-wave blocking object. Accordingly, when this kind of sudden communication with the first moving object is detected, it can be determined that there is a communication impeding intersection. Also, by determining at this time that an intersecting vehicle (i.e., a vehicle on the intersecting road, such as the first moving object) with which communication was suddenly established is within a predetermined distance range of the first vehicle (i.e., the host vehicle), sudden communication with the intersecting vehicle that arose simply because of the communication-distance relationship is able to be excluded from being used to determine the presence of a communication impeding intersection. Further, the detection device may be designed to detect a communication impeding intersection without using predetermined map data (such as map data of a navigation system).

The detection device may also be designed to detect the presence of the communication impeding intersection when the distance between i) the first vehicle at the time communication with the first moving object started and ii) a point of intersection of the intersecting road and the road on which the first vehicle is traveling is less than a predetermined distance. That is, when the point at which the sudden communication with the first moving object is detected is a sufficient distance before the intersection ahead (i.e., the point of intersection between the intersecting road and the road on which the first vehicle is traveling), it is not necessary to provide the moving object information relating to the first moving object to the second moving object (particularly a moving object (such as the second moving object) that is trailing the first vehicle (host vehicle)) indirectly. According to this construction, at least one of the communication impeding intersection information and the moving object information is transmitted to the second moving object only when the distance from the point at which the sudden communication with the first moving object is detected to the intersection ahead is less than a predetermined distance. Therefore, according to the invention, it is possible to effectively support safe driving at a communication impeding intersection without increasing the processing load on the receiving side by providing useful information only when necessary to the second moving object (i.e., the receiving side). The point of intersection of the intersecting road and the road on which the first vehicle is driving need only be calculated as the point of intersection of a running vector of the first moving object and a running vector of the first vehicle, or determined using image results from predetermined map data (such as map data of a navigation system) or a CCD camera or the like.

Further, the moving object information may include only information relating to the first moving object that is approaching the communication impeding intersection. The moving object information may also include only information relating to the first moving object that is a predetermined distance or more away from the communication impeding intersection. The communication impeding intersection information may also include information relating to the location of the communication impeding intersection. Accordingly, because only information that is useful is provided to the second moving object that will pass through the communication impeding intersection, the processing load on the receiving side is reduced so it is possible to effectively support safe driving at the communication impeding intersection. In cases where there are no moving objects (such as the second moving object) approaching the communication impeding intersection on the intersecting road, for example, no moving object information is transmitted. Even in these cases, however, the second moving object is able to detect the presence of a communication impeding intersection from the communication impeding intersection information, and can also detect, due to the lack of moving object information, that there are no moving objects (such as the first moving object) with which there is a particular danger of collision on the intersecting road.

The communication impeding intersection information may also include information relating to the presence of the radio-wave blocking object at the communication impeding intersection. As a result, the second moving object that has received the information is able to grasp the fact that there is a radio-wave blocking object at the communication impeding intersection and perform transmission/reception processing in accordance with the presence of a radio-wave blocking object exist prior to passing through the communication impeding intersection. For example, when the second moving object has received information that there is a radio-wave blocking object only on the near side (from the perspective of the vehicle sending the information) of the intersection, it is evident that it is not necessary to transmit moving object information relating to the first moving object to an oncoming vehicle, thus enabling the processing load on the receiving side to be reduced.

The presence of the radio-wave blocking object (such as the position, size, range of the radio-wave blocking object) may be evaluated based on a change in the communication state between the first vehicle and the first moving object. In this case, the presence of the radio-wave blocking object may be evaluated through stepped classification (in which the object falls within one of a plurality of classes). Also, the presence of the radio-wave blocking object may be evaluated based on the distance between i) the first vehicle at the time communication with the first moving object ends, after the first vehicle has passed through the communication impeding intersection, and ii) the communication impeding intersection.

The communication apparatus may also be designed such that, when the presence of the communication impeding intersection has been detected, the communication apparatus transmits to the second moving object at least one of the communication impeding intersection information and the moving object information only when there is not a traffic signal at the communication impeding intersection. According to this configuration, the moving object information and the like is transmitted to the second moving object only when an intersection where a collision with an intersecting vehicle is particularly likely to occur, such as a communication impeding intersection with no traffic signal, has been detected. As a result, the processing load on the receiving side is able to be kept to a minimum, thus making it possible to more effectively support safe driving at communication impeding intersections. The determination as to whether there is a traffic signal at the communication impeding intersection may be made, for example, based on predetermined map data (such as map data of a navigation system).

The vehicular driving support system may further be provided with a vehicle selecting device. This vehicle selecting device is designed to both monitor the communication state after communication has started between the first vehicle and the first moving object when a plurality of the second moving objects are on the road on which the first vehicle is traveling, and select from among the plurality of the second moving objects at least one of the second moving objects as a transmission target according to the monitoring results. According to this configuration, when monitoring the communication state after communication with the first moving object has started and selecting the second moving object which is the transmission target according to the monitoring results, it is possible to specify the second moving object that needs to indirectly receive the moving object information relating to the first moving object and the like, and transmit that moving object information and the like to only that specified second moving object, thus further reducing the processing load on the receiving side. When the directionality of the transmitting antenna cannot be changed, the data of the first vehicle (host vehicle) which includes the moving object information and the like is transmitted to an unspecified number of moving objects, as described above. Even in this case, however, the processing load on the receiving side does not increase because the receiving side (i.e., the moving object that is the transmission target) can easily determine whether the transmitted information was intended for the receiving side due to an ID code for the second moving object, which is the transmission target, contained in the data.

Further, when communication between the first vehicle and the first moving object continues after the first vehicle has passed through the communication impeding intersection, at least one of the second moving objects that has not passed through the communication impeding intersection but which is behind and traveling in the same direction as the first vehicle can be at least included as the transmission target. Also, when communication between the first vehicle and the first moving object continues after the first vehicle has passed through the communication impeding intersection, at least one of the second moving objects which is behind and traveling away from the first vehicle can be excluded from being the transmission target. In this case, because the first vehicle is able to obtain the latest moving object information when communication between the first vehicle and the first moving object continues after the first vehicle has passed through the communication impeding intersection, the first vehicle can support the second moving object, which is traveling behind and in the same direction as the first vehicle, before it passes though the communication impeding intersection. When communication between the first vehicle and the first moving object continues after the first vehicle has passed through the communication impeding intersection, the second moving object which is behind and moving away from the first vehicle can obtain at least the latest moving object information just like the first vehicle. Therefore, needless support to the moving object can be terminated.

A second aspect of the invention relates to a driving support system for a vehicle, which includes a receiving device and a transmitting device. The receiving device obtains at least one of the communication impeding intersection and the moving object information by bi-directional communication with a third moving object which is provided with the driving support system according to any form of the first aspect of the invention. The transmitting device transmits to a fourth moving object at least one of the communication impeding intersection information and the moving object information.

A third aspect of the invention relates to a driving support system for a vehicle, which includes a receiving device and a transmitting device. The receiving device obtains information relating to the presence of the radio-wave blocking object by bi-directional communication with a fifth moving object which is provided with a driving support system which is designed to evaluate the presence of the radio-wave blocking object based on the distance between i) the first vehicle at the time communication with the first moving object ends, after the first vehicle has passed through the communication impeding intersection, and ii) the communication impeding intersection. The transmitting device which transmits to a sixth moving object information relating to the presence of the radio-wave blocking object.

According to the invention, useful information, such as the communication impeding intersection information and the moving object information and the like, able to be obtained by communication between the vehicular driving support system according to the first aspect of the invention or a vehicular driving support system which is designed to evaluate the presence of the radio-wave blocking object based on the distance between i) the first vehicle at the time communication with the third (or fifth) moving object ends, after the first vehicle has passed through the communication impeding intersection, and ii) the communication impeding intersection, is transmitted to another moving object that is unable to directly receive the information (or which has not yet received the information). As a result, the information is able to be relayed, which enables the other moving object to be effectively supported. In this case, the communication impeding intersection and the moving object information and the like is able to be obtained by the vehicular driving support system, so it is unnecessary for the first vehicle itself to have functions for detecting and evaluating the presence of a communication impeding intersection and a radio-wave blocking object.

A fourth aspect of the invention relates to a driving support system for a vehicle, which includes a detecting device, a receiving device, an information generating device, and a transmitting device. The detecting device detects the presence of an intersection ahead on a road on which a first vehicle is traveling based on predetermined map data. The receiving device is provided in a communication apparatus enabling bi-directional communication between the first vehicle and an unspecified number of moving objects. This receiving device obtains information by communication with a first moving object, from among the unspecified number of moving objects, which is on an intersecting road which intersects the road on which the first vehicle is traveling at the intersection when the intersection has been detected. The information generating device generates at least one of intersection information relating to the intersection and moving object information relating to the first moving object based on the obtained information. The transmitting device transmits the generated information to a second moving object, from among the unspecified number of moving objects, which is on the road on which the first vehicle is traveling. That is, the intersection that is ahead on the road on which the first vehicle is traveling can be detected using predetermined map data (such as map data of a navigation system). According to this invention, at least one of the intersection information relating to the intersection and the moving object information relating to the moving object on the intersecting road is transmitted to the second moving object only when the intersection has been detected. Accordingly, with the invention, because only necessary information is provided to the second moving object (i.e., the receiving side), even if there is a concentration of a plurality of other vehicles, it is possible to effectively support safe driving at a communication impeding intersection without increasing the processing load on the receiving side.

According to the fourth aspect of the invention, the generated information may also be transmitted to the second moving object only when it has been detected that there is a facility of a predetermined scale or larger around the detected intersection based on the predetermined map data. According to this configuration, because the moving object information and the like is provided to the second moving object (i.e., the receiving side) only at an intersection where communication is impeded, the processing load on the receiving side is increased and it is possible to effectively support safe driving at an intersection where there is a facility of a predetermined scale or larger, in which case there is a great necessity for bi-directional communication.

According to the fourth aspect of the invention, it is possible to include only information relating to the first moving object that is in a predetermined position with respect to the facility of a predetermined scale or larger in the moving object information. According to this configuration, it is possible to transmit only information relating to the moving object with which direct communication is not possible due to the effect of the facility of a predetermined scale or larger. It is also possible to effectively support safe driving at an intersection around which there is a facility of a predetermined scale or larger, in which case there is a great necessity for bi-directional communication. It is also possible at this time to transmit only the information relating to the first moving object which is in a predetermined position with respect to the facility of a predetermined scale or larger and the second moving object (a moving object which is a transmission target) to the second moving object.

A fifth aspect of the invention relates to a vehicular control system which includes a receiving device and a control apparatus. The receiving device for receiving at least one of the communication impeding intersection information and the moving object information provided by the driving support system according to the above first aspect. The control apparatus that controls the vehicle using the received information.

A sixth aspect of the invention relates to a vehicular control system which also includes a receiving device and a control apparatus. The receiving device for receiving at least one of the communication impeding intersection information and the moving object information provided by the driving support system according to the presence of the radio-wave blocking object from a driving support system which is designed to evaluate the presence of the radio-wave blocking object based on the distance between i) the first vehicle at the time communication with the first moving object ends, after the first vehicle has passed through the communication impeding intersection, and ii) the communication impeding intersection. The control apparatus that controls the second vehicle using the received information.

According to the fifth and sixth aspects of the invention, it is possible to perform various vehicle controls (such as warning output and automatic braking) in order to prevent a collision with an intersecting vehicle, for example, using useful information, such as communication impeding intersection information and moving object information obtained by communication with the driving support system according to any form of the first aspect of the invention or a driving support system which is designed to evaluate the presence of the radio-wave blocking object based on the distance between i) the first vehicle at the time communication with the first moving object ends, after the first vehicle has passed through the communication impeding intersection, and ii) the communication impeding intersection.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a view showing one example of the structure of data to be transmitted which includes additional information and the like;

DETAILED DESCRIPTION OF THE PREFERRED EMBODIMENTS

In the following description and the accompanying drawings, the present invention will be described in more detail in terms of exemplary embodiments.

Figure 1:
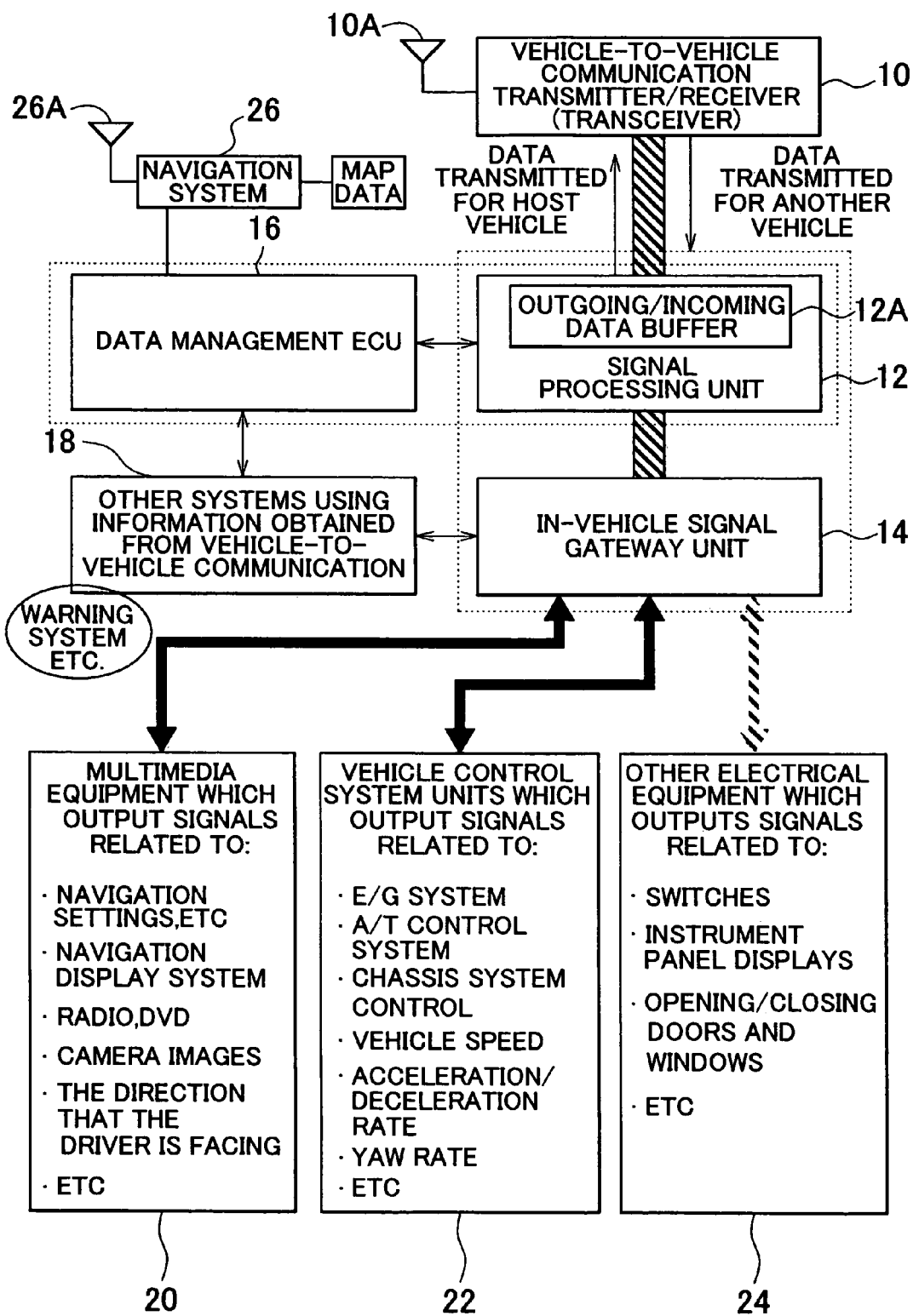
FIG. 1 is a system block diagram of a vehicle-to-vehicle communication system according to one exemplary embodiment of the invention.

FIG. 1 is a system block diagram of a vehicle-to-vehicle communication system according to one exemplary embodiment of the invention. The main component of this vehicle-to-vehicle communication system is a data management ECU 16 (electronic control unit for vehicle-to-vehicle communication). This data management ECU 16 is designed as a microcomputer which includes a CPU, ROM, RAM, and the like all connected together via a bus, not shown. Various programs to be executed by the CPU are stored in the ROM.

A navigation system 26 is connected to the data management ECU 16. This navigation system 26 includes a recording medium such as DVD, CD-ROM, or the like, on which map data is stored, as well as a GPS (Global Positioning System) receiver 26A that receives, via a GPS antenna, GPS signals transmitted from a GPS satellite, and the like. The navigation system 26 calculates the current vehicle position and direction based on the GPS signal and signals from various sensors (such as a gyro sensor and a yaw rate sensor). Electric signals indicative of the calculation results are input to a gateway unit 14, to be described later.

The map data of the navigation system 26 includes, for example, coordinates of each node corresponding to each intersection and expressway junction on the map, coordinates of traffic signals, coordinates of each apex of polygon shapes and the height for three-dimensional display of polygon shapes, links connecting adjacent nodes, widths of roads corresponding to each link, distance and travel time between each adjacent node, and road type (such as national highway, prefectural highway, expressway) stored corresponding to each link. The information in the map data of the navigation system 26 is used by the data management ECU 16 as necessary, which will be described later.

The vehicle-to-vehicle communication system is provided with a vehicle-to-vehicle communication transmitter/receiver 10 (herein simply referred to as "transceiver 10"). This transceiver 10 includes an antenna 10A for vehicle-to-vehicle communication and achieves vehicle-to-vehicle communication with another vehicle by transmitting and receiving radio-waves in a radio-wave frequency band (for example, millimeter waves in the 60 GHz band). The spectrum expansion method may be used as the communication method. Unless otherwise specified, the vehicle with which communication is established in this exemplary embodiment may include not only a plurality of vehicles (including two-wheeled vehicles), but also a plurality of people (including pedestrians), bicycles, wheelchairs, and the like.

A signal processing unit 12 is connected to the transceiver 10 via a suitable bus such as a high-speed communication bus. The gateway unit 14 and the data management ECU 16 are both connected to this signal processing unit 12 also via a suitable high-speed communication bus. The gateway unit 14 connects the signal processing unit 12 with various types of control systems and information systems and the like in the vehicle via a suitable bus such as a high-speed communication bus. Some of these control systems and information systems include the navigation system 26, multimedia equipment 20 including audio equipment, cameras, mobile phones; a control systems 22 including various control units and sensors and the like mounted in the vehicle; and various kinds of electrical equipment 24 mounted in the vehicle. Therefore, as shown in FIG. 1, a variety of signals (herein referred to as "host vehicle information signals") are input to the gateway unit 14. These signals include status signals indicative of the various states of the information systems such as the navigation system 26, image signals, control signals from the various control systems, detection signals from the various sensors, and ON/OFF signals from various switches.

The host vehicle information signals input to the gateway unit 14 are then sent to the signal processing unit 12. The signal processing unit 12 is provided with an outgoing/incoming data buffer 12A which temporarily stores the received data as well as the data to be transmitted. The signal processing unit 12 is controlled by the data management ECU 16 to both store the various host vehicle information that includes the host vehicle information signals in the outgoing/incoming data buffer 12A and generate data to be transmitted by extracting only predetermined information from the various host vehicle information (this processing will be described in detail later). The data to be transmitted is sent to the data management ECU 16 and the transceiver 10 and the like and transmitted at a predetermined cycle via the antenna 10A of the transceiver 10. The various host vehicle information stored in the outgoing/incoming data buffer 12A is updated every time there is an input from the gateway unit 14.

The structure of the data generated by the signal processing unit 12 will now be described with reference to FIGS. 2 to 4.

Figure 2:
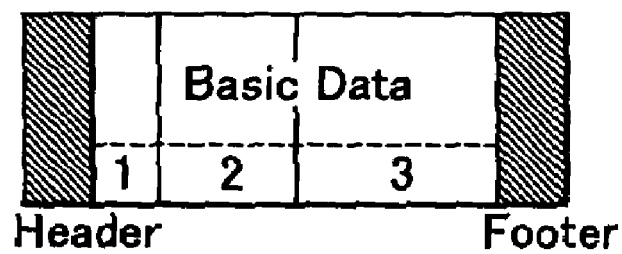
FIG. 2 is a view showing one example of the structure of data to be transmitted.

FIG. 2 shows the basic structure of the data. The data in FIG. 2 is data to be transmitted before vehicle-to-vehicle communication has been established and started (i.e., the data is data for which a transmission target has not yet been specified). This data may be transmitted in order to specify the vehicle that is a transmission target with which vehicle-to-vehicle communication will be established (i.e., for mutual confirmation prior to vehicle-to-vehicle communication).

As shown in FIG. 2, the structure of the data includes basic data, a header in front of the basic data, and a footer following the basic data. The header includes various information indicating the content of the basic data as well as various necessary data (such as information pertaining to a change in the transmission cycle). The header also indicates where the basic data starts.

The basic data includes an ID code as essential information. This ID code is a code unique to each vehicle and may be, for example, an IP address. The ID code for a person or a bicycle or the like is a code unique to a mobile device carried by the person (including a person riding on a bicycle or the like) or a mobile device attached to a bicycle or the like. This ID code may be a unique code distinguishable by the receiving side.

Also, the basic data preferably includes information regarding the position of the vehicle (herein referred to as "positional information") and information regarding the type of vehicle (herein referred to as "vehicle type information"). The positional information of the vehicle may be information indicative of the current position of the vehicle or positional information of the host vehicle (included in the host vehicle information signals input to the gateway unit 14) calculated based on the GPS signal received by the GPS receiver 26A. Positional information in the case of a person or a bicycle or the like does not have to be included in the basic data. However, when the person or bicycle or the like is equipped with a GPS receiver (for example, when the person is carrying a mobile phone having an internal GPS receiver), the positional information can be included in the basic data. The vehicle type information is a code that enables the receiving side to distinguish the vehicle type of the host vehicle. For example, the vehicle type information may be a vehicle type number on a number plate for four wheeled vehicles, a specific alphanumeric character assigned to the specific displacement amount for two wheeled vehicles, and a specific alphanumeric character for people or bicycles or the like.

This data may be repeatedly transmitted at fixed transmission cycles, and is preferably determined together with the updating cycle (e.g., 1 sec) of the positional information of the host vehicle from the GPS receiver 26A. Between updating cycles, however, the latest positional information of the host vehicle is estimated and updated using the vehicle speed sensor, yaw rate sensor, acceleration sensor and the like. When transmission can be repeated, the data may be transmitted again after every update. Specifically, the updating and re-transmitting of the latest positional information of the host vehicle is useful when the GPS receiver 26A is unable to receive the GPS signal (such as when driving through a tunnel).

The data including the ID code is transmitted via the antenna 10A of the transceiver 10, as described above, and received by a vehicle in a predetermined region. At this time, when another vehicle in the area of the host vehicle is provided with the vehicle-to-vehicle communication system of this exemplary embodiment, similar data transmitted by the other vehicle is received by the host vehicle. Accordingly, by confirming the ID code included in the data on the receiving side, it is possible to reliably identify the other vehicle that is transmitting the data even when driving in an area where a plurality of vehicles are concentrated.

An outline of the operation (i.e., processing on the receiving side) of a systems 18 using information obtained from vehicle-to-vehicle communication according to the exemplary embodiment of the invention when data is received from another vehicle in this way will now be described.

Referring back to FIG. 1, the data transmitted from the other vehicle received by the transceiver 10 is stored in the outgoing/incoming data buffer 12A of the signal processing unit 12. The signal processing unit 12 extracts only the information regarding the other vehicle (herein referred to as "other vehicle information") that is necessary from the data in the outgoing/incoming data buffer 12A that was received from the other vehicle, and sends it to the data management ECU 16 and the like.

The data management ECU 16 then calculates the running speed and direction (i.e., running vector) of the other vehicle based on a history of the positional information of the other vehicle included in the other vehicle information. The data management ECU 16 also calculates the direction of travel (i.e., running vector) of the host vehicle based on a history of the positional information of the host vehicle, as well as calculates the relative direction of travel of the other vehicle with respect to that of the host vehicle (i.e., an angle created between the direction of travel of the host vehicle and the direction of travel of the other vehicle; herein referred to as "intersecting angle") based on the calculated directions of travel of the other vehicle and the host vehicle. Further, the data management ECU 16 determines whether the other vehicle is traveling in a direction towards or away from the host vehicle based on the calculated directions of travel of the other vehicle and the host vehicle and the positional information of the other vehicle and the host vehicle. If, at this time, the running vectors intersect in the direction in which both vehicles are traveling (herein referred to as "direction of travel") and the intersecting angle is within a predetermined angular range (such as a range of ±20 degrees from 90 degrees), for example, it may be determined that the other vehicle is traveling in a direction towards the host vehicle. On the other hand, if the intersecting angle is within the predetermined angular range (such as a range of ±20 degrees from 90 degrees) but the running vectors do not intersect in the direction of travel, it may be determined that the other vehicle is traveling in a direction away from the host vehicle.

Furthermore, when it is determined that the other vehicle is traveling in a direction toward the host vehicle, the data management ECU 16 calculates either the time until the other vehicle reaches the point at which the running vectors intersect or the distance between the point at which the running vectors intersect and the position of the other vehicle, based on the calculated direction of travel of the other vehicle and the host vehicle, the positional information of both the other vehicle and the host vehicle, and the calculated running speeds of the host vehicle and the other vehicle. When the host vehicle is receiving data transmitted from a plurality of other vehicles, the data management ECU 16 makes the above-described calculations and determinations for each vehicle. The calculation and determination results from the data management ECU 16 are added as additional information to the data to be transmitted by the host vehicle.

Figure 3:
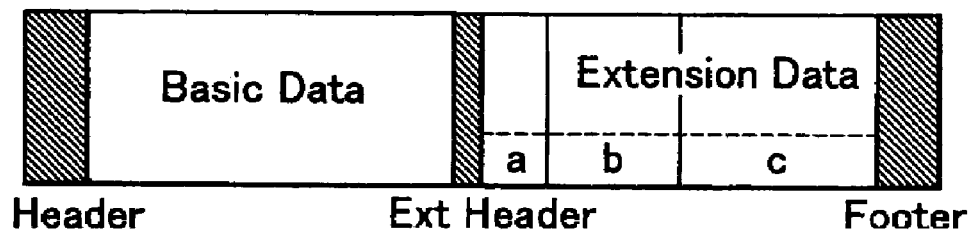

FIG. 3 shows the structure of data that includes the additional information. This additional information is incorporated into the data when a vehicle targeted for vehicle-to-vehicle communication has been specified.

As shown in the drawing, the additional information is included in extension data which follows an extension header after the basic data. The extension header includes information indicating the content of the extension data, and indicates where the extension data starts.

The ID code of the other vehicle targeted to receive the data is incorporated along with the additional information and the communication impeding intersection information (to be described later) into the extension data. When there are a plurality of the other vehicles targeted for transmission, the data including the additional information and the like may be generated for each vehicle targeted for transmission, or may incorporate a plurality of the ID codes for the vehicles targeted for transmission in the extension data. Also, additional information incorporated into the extension data may also be selected considering the need of the other vehicle targeted for transmission (this will be described in detail later). Further, suitable information of the host vehicle information that is updated and stored in the outgoing/incoming data buffer 12A, other than the additional information, may also be selectively incorporated into the extension data.

By including the ID code of the other vehicle targeted for transmission in the data to be transmitted in this way, the other vehicles that receive that data are able to determine whether the data is information intended for them by referencing the ID code. Also, because only the additional information necessary for the other vehicle targeted for transmission is selected and added to the data, as will be described later, and in all other cases, the data to be sent shown in FIG. 2 is transmitted, it is possible to minimize the processing load on the receiving side.

The additional information obtainable by vehicle-to-vehicle communication in this way can be used by other systems 18 using information obtained from vehicle-to-vehicle communication. These other systems 18 using information obtained from vehicle-to-vehicle communication includes various systems, such as a vehicle safety system which determines the potential danger of a collision based on the relative relationship (such as the relative direction, relative speed, relative distance) between the host vehicle and the other vehicle, outputs a warning and performs automatic control of the vehicle, and a vehicle following control system which controls the vehicle to follow a leading vehicle. Alternatively, the other systems 18 using information obtained from vehicle-to-vehicle communication may obtain various host vehicle information and other vehicle information directly from the signal processing unit 12 via the gateway unit 14 and perform various predetermined controls based on the obtained information.

Various information exchanged between a plurality of vehicles using this kind of vehicle-to-vehicle communication may be used by the other systems 18 using information obtained from vehicle-to-vehicle communication in each vehicle to improve driver convenience and increase driving safety. However, if random host vehicle information or all of the host vehicle information is included in the data, the amount of information able to be used by the receiving side increases. At the same time, however, the processing load on the receiving side to extract only the necessary information also increases. In particular, in environments where there is a concentration of vehicles, the amount of information received increases drastically, resulting in an extremely large processing load on the receiving side to extract only the necessary information. As a result, there may be cases where there is a delay in the provision of the necessary information to the driver or the other systems 18 using information obtained from vehicle-to-vehicle communication, which reduces the intrinsic functionality of the vehicle-to-vehicle communication system to improve driver convenience and driving safety.

Further, as described above, vehicle-to-vehicle communication uses radio-waves in the high frequency band (such as the GHz band) or laser beams or the like which theoretically do not diffract. Therefore, when there are communication blocking objects such as buildings or large vehicles around the vehicle, there is a possibility that the intrinsic functionality of the vehicle-to-vehicle communication system will be reduced due to the presence of those communication blocking objects. That is, because the radio-waves in the high frequency band region and laser beams and the like theoretically do not diffract, vehicle-to-vehicle communication between vehicles that should exchange truly necessary information (i.e., between vehicles that will likely meet at an intersection) is impeded at, for example, intersections having poor visibility due to the presence of the communication blocking objects. As a result, the intrinsic functionality of the vehicle-to-vehicle communication system decreases. In other words, at areas such as intersections with poor visibility where the function of the vehicle-to-vehicle communication system is extremely important, necessary vehicle-to-vehicle communication is impeded by the communication blocking objects. Therefore, it is necessary to extract the necessary information indirectly from the mass of information. This presents problems not only from the standpoint of the processing load on the receiving side, but also from the standpoint of driver convenience and driving safety.

In contrast, in exemplary embodiment, the characteristic structure of the invention, which will be described in detail later, makes it possible to identify the location where necessary vehicle-to-vehicle communication will be impeded (herein referred to as "communication impeding intersection") due to the presence of a communication blocking object, increase safety while driving near the communication impeding intersection, and reduce the processing load on the receiving side.

Figure 4:
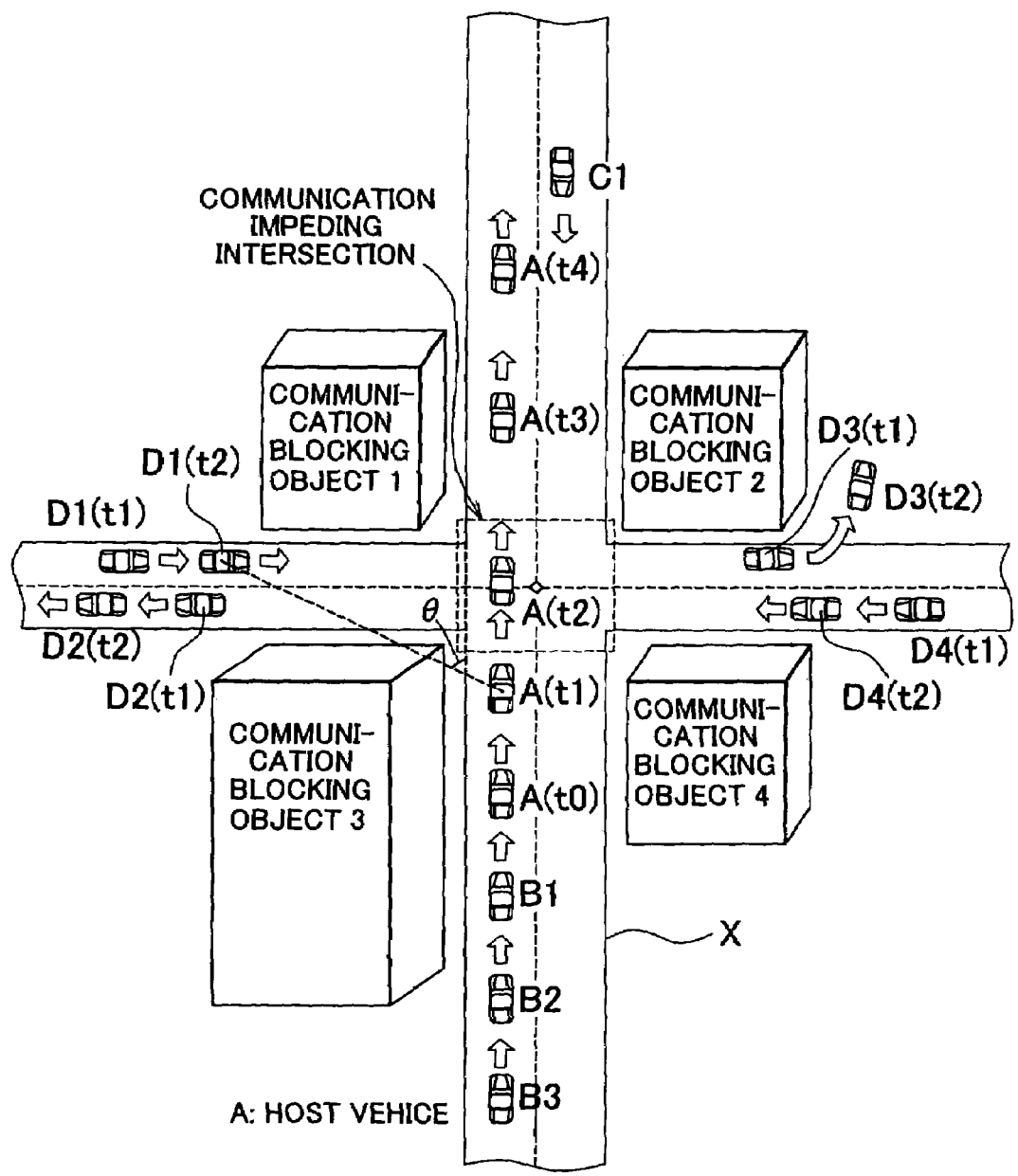
FIG. 4 is an explanatory view of the invention showing an intersection with poor visibility as one example of a communication impeding intersection.

FIG. 4 is an explanatory view of the invention showing an intersection with poor visibility as one example of a communication impeding intersection. Shown in the drawing are communication blocking objects (for example, structures such as buildings, trucks) 1, 2, 3 and 4 which define an intersection with poor visibility. Also shown are vehicles A, B1, B2, B3, C1, D1, D2, D3, and D4 coming and going through the intersection, together with changes over time (t0, t1, t2, t3, and t4) where necessary. A (t1), for example, indicates vehicle A at time t1. Vehicles A, B1 to B3, and C1 are vehicles running on a road X, while vehicles D1, D2, D3, and D4 are vehicles running on an intersecting road Y which intersects road X (hereinafter, vehicles D1, D2, D3, and D4 may therefore also be referred to as "intersecting vehicles"). Also, the respective relationships between times t1, t2, t3, and t4 are such that t0<t1<t2<t3<t4.

As shown in FIG. 4, vehicle-to-vehicle communication between vehicle A (t0) and intersecting vehicles D1, D2, D3, and D4 is impeded due to the presence of communication blocking objects 3 and 4 at time t0 (e.g., vehicle A (t0) in FIG. 4). In this case, vehicle-to-vehicle communication is taking place between vehicle A (t0) and vehicles B1 to B3 and C1 which are running on road X. That is, at time t0, vehicle A is unable to receive data transmitted from intersecting vehicles D1, D2, D3, and D4 due to the presence of the communication blocking objects 3 and 4. This is also the case for vehicles B1 to B3 which are behind vehicle A.

At time t1, however, vehicle-to-vehicle communication is no longer impeded by the communication blocking objects 3 and 4 (e.g., vehicle A (t1) in FIG. 4) so vehicle A is able to receive data transmitted from intersecting vehicles D1, D2, D3, and D4. That is, at time t1, vehicle A has moved from a state in which it is unable to receive data transmitted from intersecting vehicles D1, D2, D3, and D4 into a state in which it is able to receive data transmitted from intersecting vehicles D1, D2, D3, and D4. Vehicle A remains in this "able to receive" state through the intersection (e.g., vehicle A (t2) in FIG. 4) until it changes to the "unable to receive" state again due to communication blocking objects 1 and 2. That is, at time t3 (e.g., vehicle A (t3) in FIG. 4), vehicle A has moved from a state in which it is able to receive data transmitted from intersecting vehicles D1, D2, D3, and D4 back into a state in which it is unable to receive data transmitted from intersecting vehicles D1, D2, D3, and D4.

In this exemplary embodiment, this change in reception states with respect to data transmitted from intersecting vehicles D1, D2, D3, and D4 due to the presence of the communication blocking objects (i.e., the change between the "able to receive" state and the "unable to receive" state) is used to detect a communication impeding intersection and evaluate the presence (or impeding state) of communication blocking objects at the communication impeding intersection.

More specifically, the change in the reception state with respect to the data transmitted by the intersecting vehicles D1, D2, D3, and D4 can be detected by the other vehicle information included in the data transmitted from the other vehicle which is received by vehicle A. That is, the data management ECU 16 in this exemplary embodiment calculates the angle created between the direction of travel of the host vehicle and the direction of travel of the other vehicle (i.e., the intersecting angle) based on the history of the positional information of the other vehicle included in the data transmitted by the other vehicle and the history of the positional information of the host vehicle. Before time t1 (and after time t3), vehicle A is not able to receive data sent by the intersecting vehicles D1, D2, D3, and D4, so it calculates only the intersecting angles relating to vehicles B1 to B3 and C1. Accordingly, the calculation results of these intersecting angles include only angles within a range which is centered around 0 degrees due to the fact that the vehicles B1 to B3 and C1 are traveling on road X, on which vehicle A is traveling. On the other hand, at times t1 to t3, vehicle A is able to receive the data transmitted from intersecting vehicles D1, D2, D3, and D4, as well as the data transmitted by vehicles 1B to B3 and C1. Therefore, other than the intersecting angles centered around 0 degrees, the intersecting angles within a range centered around 90 degrees are included in the calculation results for the intersecting angle. That is, at time t1, new ID codes (i.e., the ID codes for intersecting vehicles D1, D2, D3, and D4) are confirmed and the intersecting angles near 90 degrees (i.e., the intersecting angles related to intersecting vehicles D1, D2, D3, and D4) suddenly appear in the calculation results of the intersecting angle. Accordingly, by constantly monitoring the calculation results of the intersecting angle from the data management ECU 16 and detecting the point at which the intersecting angle near 90 degrees suddenly appears in the calculation results of the intersecting angle, it is possible to detect the start of sudden communication between vehicle A and intersecting vehicles D1, D2, D3, and D4, i.e., it is possible to detect the probability that there is a communication impeding intersection.

At this time, the data management ECU 16 evaluates the relationship between the positions of the intersecting vehicles D1, D2, D3, and D4 and the position of the host vehicle based on the information obtained by the sudden communication in order to determine whether the point where the communication suddenly started is actually near the intersection. More specifically, the data management ECU 16 determines whether the angle $\theta$ created by a line connecting the positions of the intersecting vehicles D1, D2, D3, and D4 and the position of the host vehicle, and the running vector of the host vehicle (see FIG. 4) is within a predetermined angle centered around 90 degrees. If the angle $\theta$ is within the predetermined angle centered around 90 degrees, it is determined that the point where the communication suddenly started is actually near the intersection and that intersection is determined to be a communication impeding intersection. The determination as to whether the point where communication suddenly started is actually near the intersection can also made based on the relationship between the location of the intersection obtained from the map data in the navigation system 26 and the position of the host vehicle, instead of, or in addition to, the method described above.

Also, when it has been detected that communication has suddenly started, the data management ECU 16 may also evaluate the respective distances between the intersecting vehicles D1, D2, D3, and D4 and the host vehicle based on the information with the suddenly obtained information. If in this case the distance between the intersecting vehicle and the host vehicle is greater than a predetermined distance, the data management ECU 16 may determine that the reason for this sudden communication is not because of the presence a communication blocking object, but rather because the distance between the intersecting vehicle and the host vehicle becomes less than distance beyond which communication between the two vehicles is difficult, and therefore the data management ECU 16 may be unable to determine whether the intersection is a communication impeding intersection.

Next, at time t3, the new ID codes (i.e., the ID codes for intersecting vehicles D1, D2, D3, and D4) confirmed after time t1 disappear along with the intersecting angles near 90 degrees from the calculation results of the intersecting angle. Therefore, by detecting either the time or vehicle running distance from the point where the intersecting angle near 90 degrees suddenly appeared in the calculation results of the intersecting angle (i.e., the point that a communication impeding intersection was detected) to the point where the data including the ID codes of the intersecting vehicles D1, D2, D3, and D4 became unable to be received (or the time that the intersecting angle near 90 degrees, which was obtained after time t1, disappeared), it is possible to evaluate the presence (or the communication impeding state) of a communication blocking object at the communication impeding intersection.

More specifically, the data management ECU 16 in this exemplary embodiment first determines that the communication impeding intersection at the location where the new ID codes were detected and where the appearance of the intersecting angle near 90 degrees in the calculated results of the intersecting angle was detected, is a communication impeding intersection where communication blocking objects (e.g., communication blocking objects 3 and 4 in FIG. 4) are present on the near side (from the perspective of the vehicle) of the intersection. The data management ECU 16 then continues to monitor the reception state of the ID codes for the intersecting vehicles D1, D2, D3, and D4 and detects a disappearance time t3 (or a time t3 at which the intersecting angle near 90 degrees disappeared from the calculation results of the intersecting angle) of the ID codes for the intersecting vehicles D1, D2, D3, and D4. At this time, if communication blocking objects 1 and 2 are present on the far side of the intersection (from the perspective of the vehicle), as shown in FIG. 4, for example, the ID codes for the intersecting vehicles D1, D2, D3, and D4 that appeared in the data received by vehicle A at time t1 disappear from the data received by vehicle A at time t3 immediately after vehicle A passes through the communication impeding intersection. Accordingly, the time during which the ID codes for the intersecting vehicles D1, D2, D3, and D4 are detected is relatively short. On the other hand, when the communication blocking objects 1 and 2 shown in FIG. 4 are not present, the ID codes for the intersecting vehicles D1, D2, D3, and D4 continue to be confirmed as before even after time t3 after vehicle A has passed through the communication impeding intersection (i.e., the vehicle-to-vehicle communication between vehicle A and intersecting vehicles D1, D2, D3, and D4 is still possible even after time t3). Accordingly, the time during which the ID codes for the intersecting vehicles D1, D2, D3, and D4 are detected is relatively long. Therefore, when the time between the point at which the communication impeding intersection is detected and the point at which the ID codes for the intersecting vehicles D1, D2, D3, and D4 disappear (or the running distance during that time) is relatively short, the data management ECU 16 of this exemplary embodiment determines that the intersection is a communication impeding intersection with communication blocking objects on the far side (e.g., communication blocking objects 1 and 2 in FIG. 4). In all other cases, the data management ECU 16 determines that the intersection is a communication impeding intersection with no communication blocking objects on the far side (e.g., communication blocking objects 1 and 2 in FIG. 4).

At this time, the data management ECU 16 may also evaluate the respective distances between the intersecting vehicles and the host vehicle again based on the information obtained from communication immediately before communication with the intersecting vehicles was interrupted. If in this case the distance between the intersecting vehicles and the host vehicle is greater than a predetermined distance, the data management ECU 16 may determine that the reason for this interruption in communication is not because of the presence a communication blocking object, but rather because the distance between vehicle A and the intersecting vehicle has become greater than a distance over which communication between the two is possible, and therefore the data management ECU 16 may be unable to determine whether the intersection is a communication impeding intersection.

In order to more accurately evaluate the presence of communication blocking objects on the far side of the communication impeding intersection, the data management ECU 16 may identify the correct location of the communication impeding intersection using the map data from the navigation system 26 and take the running speed (detectable with a wheel speed sensor) of the vehicle (vehicle A) after passing through the communication impeding intersection into consideration.

The information relating to the communication impeding intersection evaluated by the data management ECU 16 of vehicle A in this way (herein referred to as "communication impeding intersection information") is added, along with the additional information, to the data to be transmitted from vehicle A. At this time, the additional information added to the data to be transmitted may be selected according to the presence of a communication blocking object at a communication impeding intersection or a vehicle targeted to receive the data transmitted by vehicle A, as will be described in detail later.

More specifically, when a communication impeding intersection in which there are communication blocking objects on both the near and far sides of the intersection, as shown in FIG. 4, is detected, the data to be transmitted from vehicle A includes the ID codes for the oncoming vehicle C1 and trailing vehicles B1 to B3 as essential information, as well as the communication impeding intersection information and additional information relating to the intersecting vehicles D1, D2, D3, and D4. At this time, the communication impeding intersection information may include not only information indicative of a communication impeding intersection with communication blocking objects on both the near and far sides, but also information relating to the location of the communication impeding intersection. The additional information may also include information relating to the running speeds of the intersecting vehicles D1, D2, D3, and D4 and information relating to the distance between the intersecting vehicles D1, D2, D3, and D4 and the communication impeding intersection, as described above. However, additional information relating to vehicles traveling away from the communication impeding intersection, such as intersecting vehicles D2 and D3 in FIG. 4, is not added to the data to be transmitted from vehicle A in order to reduce the processing load on the receiving side. In other words, because additional information relating to the running state of vehicles that are traveling away from the communication impeding intersection is not necessary for vehicles traveling toward the communication impeding intersection (i.e., because vehicle A will not meet a vehicle traveling away from the communication impeding intersection at the communication impeding intersection), only the additional information relating to the running state of vehicles (i.e., intersecting vehicles D1 and D4) that are approaching the communication impeding intersection is added to the data transmitted from vehicle A. Accordingly, when there is only one intersecting vehicle and that intersecting vehicle is traveling away from the communication impeding intersection, only the communication impeding intersection information (i.e., only information indicating a communication impeding intersection with communication blocking objects present on the near and far sides) is included in the data transmitted from vehicle A.

Therefore, the oncoming vehicle C1 and trailing vehicles B1 and B3, which have all received the data transmitted by vehicle A, are able to confirm the presence of a communication impeding intersection (i.e., an intersection with poor visibility) ahead in the respective directions of travel, as well as obtain additional information relating to the running state of the intersecting vehicles D1 and D4 on intersecting road Y. Therefore, despite the fact that vehicle-to-vehicle communication between vehicle A and the intersecting vehicles D1, D2, D3, and D4 is impeded until near the communication impeding intersection, it is still possible to pass safely through the communication impeding intersection. For example, the trailing vehicles B1 to B3 that have received the data transmitted by vehicle A are able to determined the possibility of collision with the intersecting vehicles D1 and D4 at the communication impeding intersection before reaching the communication impeding intersection by calculating the time until the intersecting vehicles D1 and D4 reach the communication impeding intersection based on the additional information relating to the running state of the intersecting vehicles D1 and D4 and the communication impeding intersection information, and comparing that time with the time until the trailing vehicles B1 to B3 themselves reach the communication impeding intersection.

Further, transmission of the data which includes the communication impeding intersection information and the additional information may be stopped i) at the point when the trailing vehicles B1 to B3 or the oncoming vehicle C1 pass through the communication impeding intersection (or when the information is received, updated, and transmitted again by the trailing vehicles B1 to B3 or the oncoming vehicle C1, to be described later), ii) at a predetermined point after which the trailing vehicles B1 to B3 or the oncoming vehicle C1 have run a predetermined distance (or time) after passing through the communication impeding intersection, or iii) at the time when the intersecting vehicles related to the additional information have passed through the communication impeding intersection. After that point, the data shown in FIG. 2 is transmitted until a new communication impeding intersection is detected, for example. Accordingly, only the minimum necessary additional data, as described above, is included in the data transmitted from vehicle A to be received by oncoming vehicle C1 and trailing vehicle B1 to B3, and the data is transmitted from vehicle A for the minimum duration of time necessary. As a result, there is not a high processing load on the receiving side, which enables the receiving side to use the additional information related to the running state of the intersecting vehicles included in the data sent from vehicle A quickly and effectively.

On the other hand, when a communication impeding intersection in which there are only communication blocking objects on the near side the intersection are detected (i.e., when a communication impeding intersection in which the communication blocking objects 1 and 2 in FIG. 4 are not present), the data to be sent by vehicle A includes the ID codes of trailing vehicles B1 to B3 as essential data, as well as the communication impeding intersection information and the additional information relating to the running states of the intersecting vehicles D1 and D4. At this time, the communication impeding intersection information may include information relating to a communication impeding intersection having a communication blocking object only on the near side the intersection, as well as information relating to the location of the communication impeding intersection. Here, the communication impeding intersection which, from the standpoint of vehicle A, only has a communication blocking object on the near side of the intersection, is a communication impeding intersection which, from the standpoint of vehicle C1, only has a communication blocking object on the far side of the intersection (i.e., the communication impeding intersection has good visibility ahead from the perspective of vehicle C1 so it is conceivable that vehicle-to-vehicle communication between oncoming vehicle C1 and intersecting vehicles D1, D2, D3, and D4 is able to take place). As a result, the ID code for the oncoming vehicle C1 is not included in the data to be transmitted from vehicle A.

As a result, the trailing vehicles B1 to B3 which have received the data transmitted from vehicle A are able to confirm the presence of the communication impeding intersection (i.e., an intersection having poor visibility) ahead in the direction of travel, as well as obtain additional information related to the running states of intersecting vehicles D1 and D4 on intersecting road Y, as described above. As a result, it is possible to pass through the communication impeding intersection safely despite the fact that vehicle-to-vehicle communication between the trailing vehicles B1 to B3 and intersecting vehicles D1, D2, D3, and D4 is impeded until close to the communication impeding intersection.

Further, transmission of the data which includes the communication impeding intersection information and the additional information may be stopped i) at the point when the data transmitted from the intersecting vehicles D1, D2, D3, and D4 is interrupted or the trailing vehicles BI to B3 pass through the communication impeding intersection (or when the information is received, updated, and transmitted again by the trailing vehicles B1 to B3, to be described later), ii) at the point when the trailing vehicles B1 to B3 have run a predetermined distance (or time) after passing through the communication impeding intersection, or iii) at the time when the intersecting vehicles related to the additional information have passed through the communication impeding intersection. After that point, the data shown in FIG. 2 is transmitted until a new communication impeding intersection is detected, for example. Accordingly, only the minimum necessary additional data, as described above, is included in the data transmitted from vehicle A to be received by trailing vehicles B1 to B3, and the data is transmitted from vehicle A for the minimum duration of time necessary, so there is not a high processing load on the receiving side. As a result, there is no delay in the timing when the additional information relating to the running state of the intersecting vehicles is used. On the other hand, oncoming vehicle C1 is able to receive the data transmitted by vehicle A, but is able to easily determined that data is not necessary (for oncoming vehicle C1) because the ID code for oncoming vehicle C1 is not included in the data. However, in this case, the oncoming vehicle C1 may continue to receive the additional information relating to the running states of intersecting vehicles D1, D2, D3, and D4 obtained by vehicle A, update the additional information through vehicle-to-vehicle communication directly with intersecting vehicles D1, D2, D3, and D4, and support trailing vehicles B2 and B3 and the like even further behind vehicle A.

The communication impeding intersection information and additional information in the data generated and sent by vehicle A in this way is updated by the vehicle (such as trailing vehicle B1) that receives the data, and then transmitted to another trailing vehicle (such as trailing vehicle B2) which will pass through the communication impeding intersection. At this time, the communication impeding intersection information also may be updated because, when the communication blocking object is a moving object such as a stopped truck or the like, for example, there may be a change in the presence of a communication blocking object at a communication impeding intersection (i.e., a change in the type of communication impeding intersection) due to the communication blocking object moving. In this way, according to this exemplary embodiment, a pseudo real-time database can be generated around the communication impeding intersection so as to enable the latest communication impeding intersection information and additional information relating to intersecting vehicles to always be obtained. The same applies to when intersecting road Y is made the reference, so the intersecting vehicles D1, D2, D3, and D4 running on intersecting road Y can always obtain the latest communication impeding intersection information and additional information relating to the running states of vehicles A, B1 to B3, and C1 that are running on road X.

Here, the communication impeding intersection information obtained when passing through the communication impeding intersection in this way is preferably linked to the map data from the navigation system 26 and stored in the RAM and the like. As a result, when the vehicle comes near the communication impeding intersection again, even if the vehicle did not obtain communication impeding intersection information from another vehicle before passing through the communication impeding intersection, it is still possible to be aware, at the very least, that there is a communication impeding intersection ahead so the vehicle can pass safely through the communication impeding intersection. Further, because it is possible to provide communication impeding intersection information to trailing vehicles and the like before passing through the communication impeding intersection, it is possible to make the trailing vehicles and the like aware of the presence of the communication impeding intersection a sufficient distance before the communication impeding intersection. Also at this time, the communication impeding intersection information in the RAM may be updated and stored using either the latest communication impeding intersection information obtained from another vehicle orself-obtained communication impeding intersection information. When the vehicle has received data transmitted from a leading vehicle before passing through the communication impeding intersection, it is possible to use the additional information relating to the running state of the intersecting vehicles before passing through the communication impeding intersection, thus enabling the vehicle to pass safely through the communication impeding intersection.

Thus, according to the exemplary embodiment, it is possible to be made aware of an intersection with poor visibility (i.e., a communication impeding intersection), which is a critical place for vehicle-to-vehicle communication, from the monitoring results of the reception state of the data transmitted from intersecting vehicles. Further, it is possible to effectively support safety when driving through an intersection with poor visibility by providing communication impeding intersection information which indicates the presence of the intersection with poor visibility together with additional information relating to the running state of intersecting vehicles to a vehicle (a trailing vehicle or an oncoming vehicle) with which vehicle-to-vehicle communication with the intersecting vehicles is not possible. Further, the data which includes the additional information and the communication impeding intersection information is transmitted in the smallest volume necessary, and for the shortest duration necessary, for the receiving side. This reduces the processing load on the receiving side, which enables the information obtained through vehicle-to-vehicle communication to be used quickly.

Moreover, the exemplary embodiment is particularly well suited to support safe driving at intersections with poor visibility that have no traffic signals because at these kind of intersections the likelihood of a collision with an intersecting vehicle is quite high. In other words, even at intersections with poor visibility, if there is a traffic signal, the additional information relating to the driving state of intersecting vehicles may be unnecessary. Accordingly, when a communication impeding intersection has been detected, it can be determined whether there is a traffic signal at the communication impeding intersection, and the additional information and communication impeding intersection information can be added to the data to be transmitted only when there is no traffic signal. Alternatively, it is possible to add information relating to the presence or absence of a traffic signal at the communication impeding intersection. The determination as to whether or not there is a traffic signal can be made based on traffic signal information included in the map data from the navigation system 26.

In this exemplary embodiment, additional information relating to the running state of a vehicle approaching the communication impeding intersection (herein referred to as "approaching vehicle" is added to the data to be transmitted by vehicle A when a communication impeding intersection has been detected. On the other hand, additional information relating to the running state of vehicles traveling away from the communication impeding intersection is not added to that data. Alternatively, however, it is also possible not to add additional information relating to an approaching vehicle that is within a predetermined distance from a communication inhibiting intersection to the data to be transmitted by vehicle A. This is because when the distance from the approaching vehicle to the communication impeding intersection is extremely short, it can be assumed that the approaching vehicle may pass through the communication impeding intersection before oncoming vehicle C1 and trailing vehicles B1 to B3 reach the communication impeding intersection. However, the predetermined distance in this case may be set considering the vehicle position and running speed of the approaching vehicle as well as the vehicle positions and running speeds of oncoming vehicle C1 and trailing vehicles B1 to B3. As a result, the processing load on the receiving side is reduced even more, so at least the necessary additional information relating to the running state of the vehicle can be used quickly and efficiently.

Furthermore, in this exemplary embodiment, the presence of a communication impeding intersection is detected based on the reception history of data transmitted from an intersecting vehicle and the reception history of the data transmitted from a vehicle on the road. Alternatively, however, even if the reception history of data transmitted from the vehicle on the road is not used, it is still possible to determine whether an intersection ahead on the road on which the vehicle is traveling is a communication impeding intersection by evaluating the distance from the host vehicle position at the time data sent from the intersecting vehicle started to be received until the intersection. In this case, the location of the intersection may be calculated as the point of intersection of the running vector of the host vehicle and the running vector of the intersecting vehicle, or it may be determined based on the intersection information obtained from the map data of the navigation system 26.

Also, even if the intersection information obtained from the map data of the navigation system 26 is used by itself, it is still possible to detect the presence of a communication impeding intersection. In this case, whether or not an intersection ahead on the road on which the vehicle is traveling is a communication impeding intersection can be determined based on polygon information (e.g., size and height of the polygon shape) of the area of the intersection included in the map data. Accordingly, as described above, if it is determined that the intersection is a communication impeding intersection (for example, if it is determined that there is a facility of a predetermined scale or larger), it is possible to provide other vehicles with additional information and the like only when necessary by adding additional information and communication impeding intersection information to the data to be transmitted when the vehicle has come within a predetermined distance from the communication impeding intersection, thus enabling the processing load on the receiving side to be reduced while ensuring the reliability of the information. Also in this case, it is possible to estimate the range within which vehicle-to-vehicle communication will be impeded from the relationship between the area of the polygon shape (the position of the facility of a predetermined scale or larger) and the position of the intersecting vehicles, so it is also possible to transmit data only to a vehicle within that range. Also, the additional information relating to the running state of the intersecting vehicles may be provided to the trailing vehicles and oncoming vehicle only when the area of the polygon shape is on the line connecting the position of the intersecting vehicles with the trailing vehicles and oncoming vehicle.

Further, according to this exemplary embodiment of the invention, information indicative of whether or not the intersection is a communication impeding intersection having a communication blocking object only on the near side or on both the near and far sides is included in the communication impeding intersection. However, it is also possible to make that determination by further classifying the communication blocking object at the communication impeding intersection and including the determination results in the communication impeding intersection. More specifically, with vehicle A as the reference, the following seven types of communication impeding intersections having communication blocking objects may be considered in addition to the two types described above. These are: 1) a communication impeding intersection having a communication blocking object on the left on the near side of the intersection (communication blocking object 3) and communication blocking objects on both sides on the far side of the intersection (communication blocking objects 1 and 2); 2) a communication impeding intersection having a communication blocking object (communication blocking object 3) on the left on the near side of the intersection and a communication blocking object (communication blocking object 1 or 2) on either the left or right on the far side of the intersection; 3) a communication impeding intersection having a communication blocking object (communication blocking object 3) on the left on the near side of the intersection but no communication blocking objects (communication blocking objects 1 and 2) on either side on the far side of the intersection; 4) a communication impeding intersection having a communication blocking object (communication blocking object 4) on the right on the near side of the intersection and communication blocking objects (communication blocking objects 1 and 2) on both sides on the far side of the intersection; 5) a communication impeding intersection having a communication blocking object (communication blocking object 4) on the right on the near side of the intersection and a communication blocking object (communication blocking object 1 or 2) on either the left or right on the far side of the intersection; 6) a communication impeding intersection having a communication blocking object (communication blocking object 4) on the right side on the near side of the intersection but no communication blocking objects (communication blocking objects 1 and 2) on either side on the far side of the intersection; and 7) a communication impeding intersection having communication blocking objects (communication blocking object 3 and 4) on both sides on the near side of the intersection and a communication blocking object (communication blocking object 1 or 2) on either the left or right on the far side of the intersection.

Any of these types of communication impeding intersections can be determined using the communication impeding intersection information included in the data transmitted from intersecting vehicles D1, D2, D3, and D4. For example, when the communication impeding intersection information obtained from intersecting vehicles D1 and D2 indicates a communication impeding intersection having only communication blocking objects 1 and 3 on the near side of the intersection, and self-obtained communication impeding intersection information from vehicle A indicates a communication impeding intersection having only communication blocking objects 3 and 4 on the near side of the intersection, it can be determined that the intersection is a communication impeding intersection having communication blocking objects 1, 3, and 4 (i.e., communication impeding intersection type 7 when vehicle A is the reference).

Alternatively, any of these types of communication impeding intersections can be determined based on the positional information of intersecting vehicles included in data transmitted from the intersecting vehicles. In FIG. 4, for example, when communication between vehicle A and intersecting vehicles D1 and D2 to the left with respect to the position of vehicle A is ongoing before time ti and communication is suddenly established between vehicle A and intersecting vehicles D3 and D4 to the right with respect to the position of vehicle A at time t1, it can be determined that the intersection is a communication impeding intersection of type 4, 5 or 6. Then, when the positional information of intersecting vehicles obtained after time t1 is monitored and data transmitted from intersecting vehicles (not limited to intersecting vehicles D3 and D4) to the right with respect to the position of vehicle A is interrupted at time t3, for example, it can be determined that the intersection is a communication impeding intersection type 5, in which there is a communication blocking object 4 on the right on the near side of the intersection and a communication blocking object 2 on the right on the far side of the intersection. In this case, it is also possible to add only the communication impeding intersection indicating the type of communication impeding intersection determined by classification and the additional information relating to the intersecting vehicles approaching the communication impeding intersection from the right (or from the left when viewed from the perspective of oncoming vehicle C1) to the data transmitted from vehicle A to oncoming vehicle C1 and trailing vehicles B1 to B3. As a result, it is possible to further reduce the processing load on the receiving side.

Figure 5:
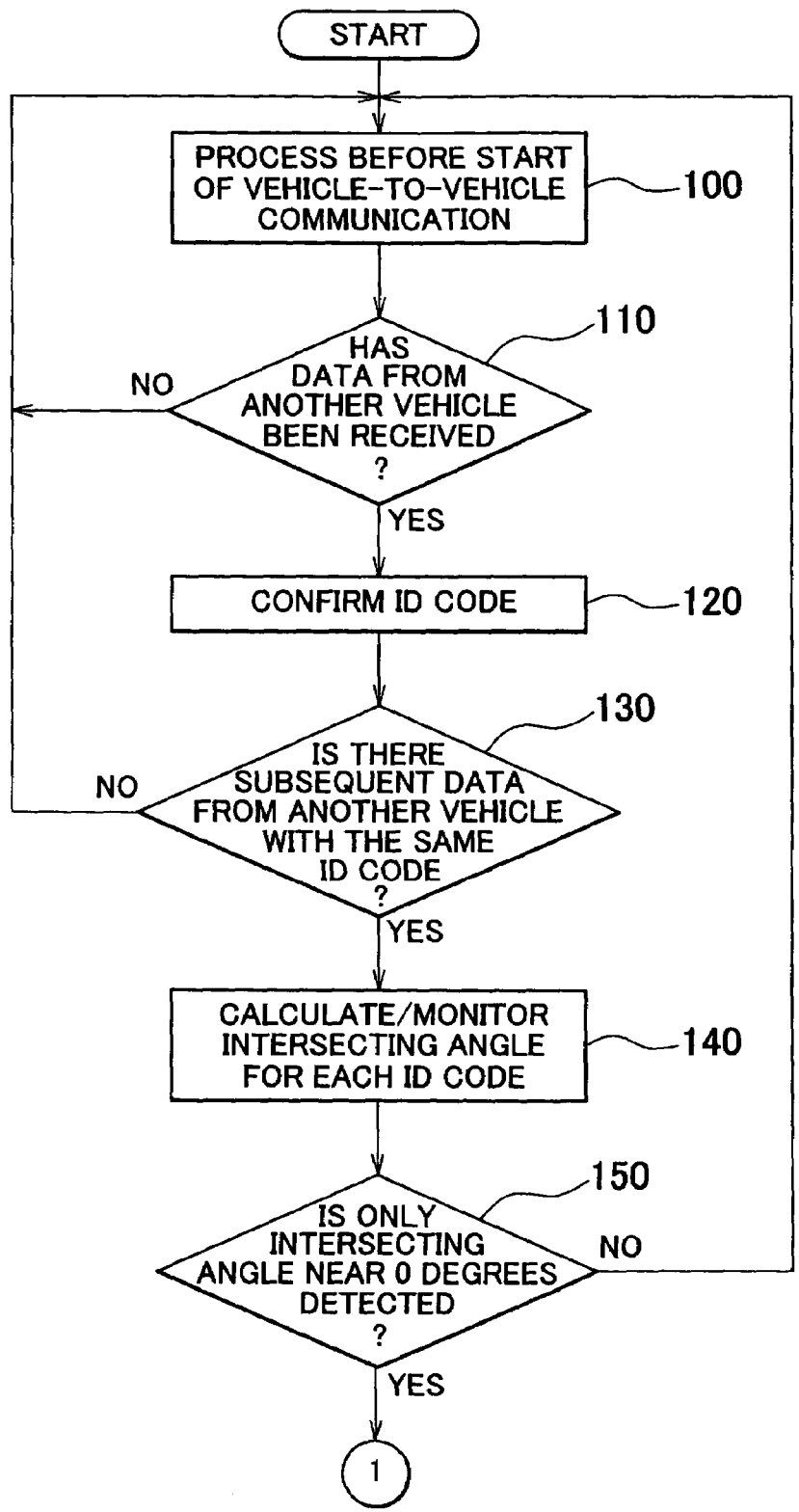
FIG. 5 is a flowchart illustrating one example of a main routine executed by the vehicle-to-vehicle communication system according to this exemplary embodiment of the invention.

Next, the processes to achieve the foregoing exemplary embodiment will be described in detail with reference to FIGS. 5 to 8. FIG. 5 is a flowchart illustrating one example of a main routine carried out by the vehicle-to-vehicle communication system according to the exemplary embodiment. This main routine starts from the time the ignition switch is turned on, for example. In the following description, the host vehicle is the vehicle in which this processing is being performed.

When the routine shown in FIG. 5 starts, first in step 100, as a process before the start of vehicle-to-vehicle communication, the data shown in FIG. 2 is transmitted regularly and the system prepares to receive data transmitted from another vehicle. The process in step 100 continues until it is determined in step 110 that the data transmitted from another vehicle (including a plurality of other vehicles) has been received. When it has been determined in step 110 that data from another vehicle has been received, the ID code from the data sent from the other vehicle is confirmed and the other vehicle is recognized by the ID code in step 120.

Then in step 130, it is determined whether the subsequent data including an ID code the same as the ID code included in the data received in step 120 has been received. If receipt of the subsequent data is not confirmed, the routine returns to step 100. On the other hand, if receipt of the subsequent data is confirmed, step 140 is executed. When the data is received from a plurality of other vehicles in step 110, it is sufficient that the subsequent data including at least one of the same ID codes be confirmed in step 130.

Next in step 140, a process is performed in which the intersecting angle is calculated and monitored for each ID code confirmed in step 130. The intersecting angle can be calculated as the angle created by the direction of travel of the host vehicle and the direction of travel of the other vehicle based on the history of the positional information of the other vehicle included in the data and the history of the positional information of the host vehicle, as described above. This intersecting angle can be calculated from as few as two data receptions. The process in step 140 is performed with every receiving cycle of the data.

Figure 6:
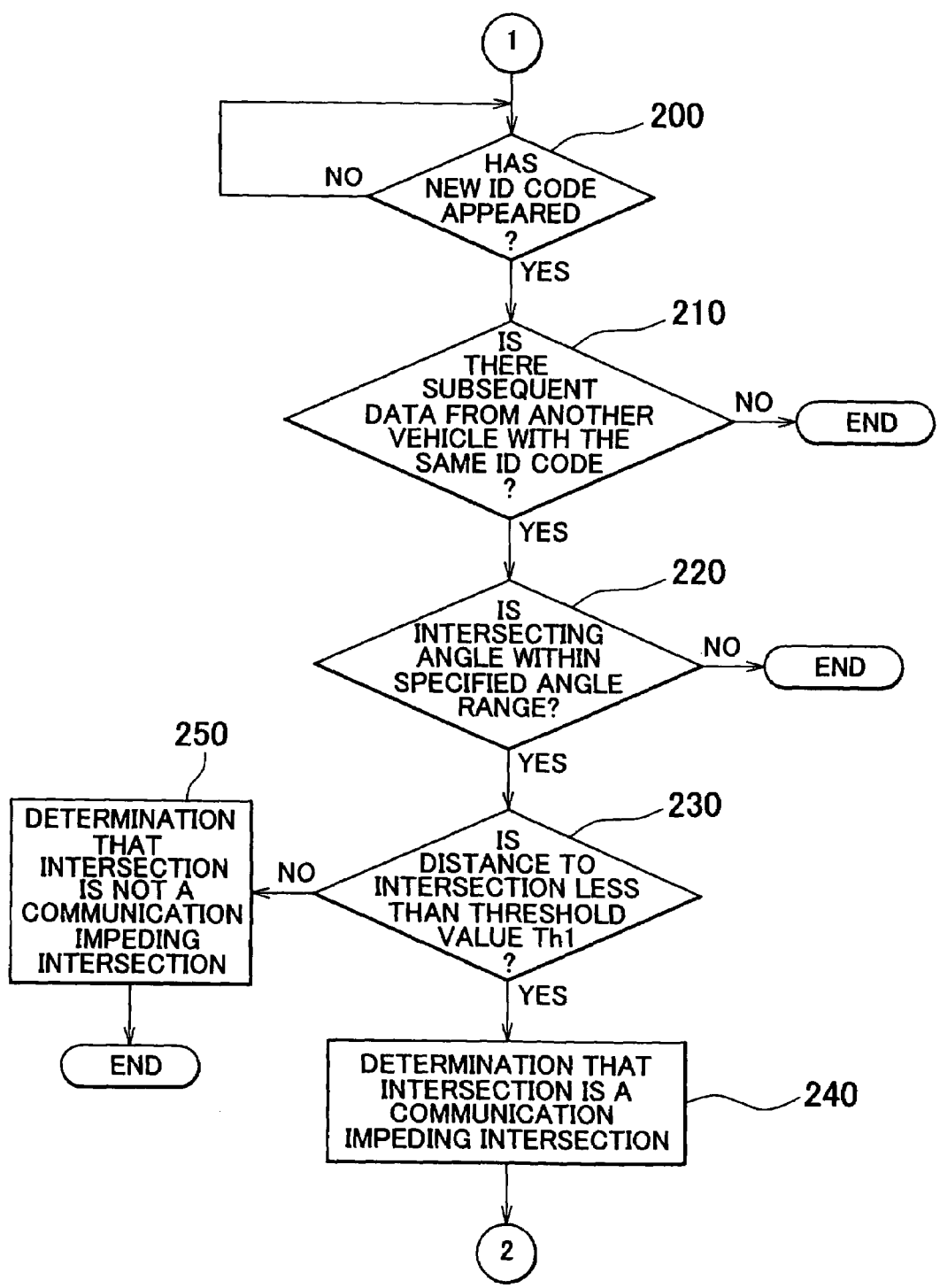
FIG. 6 is a flowchart illustrating one example of a subroutine executed for detecting a communication impeding intersection.

In step 150, it is determined whether the calculation results of the intersecting angle obtained in step 140 are made up of only an intersecting angle near 0 degrees. When an intersecting angle other than one near 0 degrees (such as an intersecting angle near 90 degrees) is included in the calculation results of the intersecting angle, determination of a communication impeding intersection is not possible and the routine returns to step 100. On the other hand, when the calculation results of the intersecting angle are made up of only an intersecting angle near 0 degrees, it is determined that the current running position is sufficiently far away from the intersection and the subroutine shown in FIG. 6 is then executed in order to detect a communication impeding intersection. In step 150, it may also be determined whether the state in which only the intersecting angle near 0 degrees is present in the calculation results of the intersecting angle continues for a predetermined period of time (or a predetermined number of calculations), in order to increase the accuracy of determination with respect to whether the current running position is sufficiently far away from the intersection.

FIG. 6 is a flowchart illustrating one example of a subroutine executed to detect a communication impeding intersection. When the subroutine shown in FIG. 6 starts, first in step 200, it is determined whether data including a new ID code (or a plurality thereof) has been received. If receipt of data including a new ID code is confirmed, step 210 is executed. If not, the subroutine returns to step 200.

In step 210 it is determined whether data subsequent to the data including the new ID code that was confirmed in step 200 has been received. If receipt of data after the data including the new ID code has been confirmed, step 220 is executed. If not, calculation of the intersecting angle in the next step, step 220, cannot be done so the subroutine ends, returning back to the main routine shown in FIG. 5. If the vehicle orientation calculated by the navigation system 26 is included in the data, however, the intersecting angle can also be calculated based on the orientations of the host vehicle and the other vehicle. In this case, the intersecting angle can be calculated even if data has only been received once (i.e., the calculation process for the intersecting angle in step S220 is possible) so step 220 is executed.

In step 220, a process is carried out to calculate the intersecting angle for each new ID code confirmed in step 200, and determine whether the intersecting angle within a predetermined angle range centered around 90 degrees (e.g., a range of 90 degrees ±20 degrees) is included in the calculation results. If the intersecting angle within the predetermined angle range centered around 90 degrees is not included in the calculation results, it is determined that the current running position is sufficiently far away from the intersection so the subroutine ends, returning back to the main routine in FIG. 5. On the other hand, if the intersecting angle within the predetermined angle range centered around 90 degrees is included in the calculation results (i.e., if an intersecting vehicle has been detected), it is determined that there is an intersection ahead of the vehicle so step 230 is executed. At this time, the accuracy of the detection results for the intersecting angle can also be increased using the map data from the navigation system 26, captured image processing results from the front monitoring camera (CCD camera), or the detection results of a magnetic marker using radar equipment.

Figure 7:
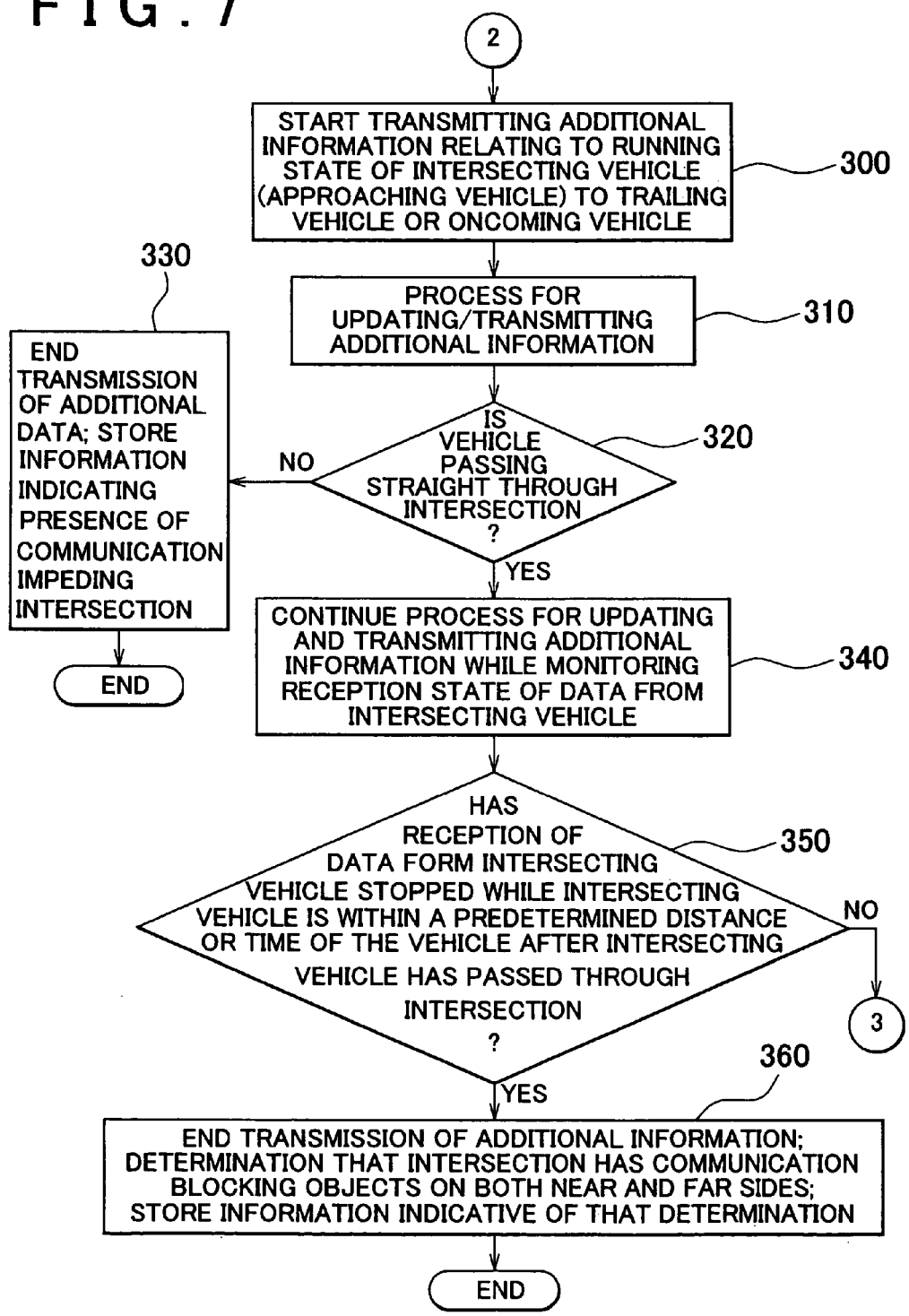
FIG. 7 is a flowchart illustrating one example of a subroutine executed when a communication impeding intersection has been detected ahead.

In step 230, a process is carried out to calculate the distance between the vehicle at the time the intersection within the predetermined angle range is detected (i.e., the host vehicle position when the intersecting vehicle is detected) and the location of the intersection ahead, and determine whether the calculated distance is smaller than a predetermined distance Th1 (e.g., 200 m). The location of the intersection may be calculated as the point of intersection of the running vector of the intersecting vehicle and the running vector of the host vehicle, or may be determined using the map data from the navigation system 26 or the captured image processing results from the front monitoring camera (CCD camera), or the like, as described above. If the distance between the vehicle at the time the intersecting angle within the predetermined angle range is detected and the intersection ahead is equal to, or greater than, the predetermined distance Th1, it is determined that vehicle-to-vehicle communication will not be impeded at the intersection ahead so step 250 is executed. In step 250, information indicative of the fact that the intersection ahead is not a communication impeding intersection is stored and the subroutine ends, returning back to the main routine in FIG. 5. On the other hand, if the distance to the intersection ahead is less than the predetermined distance Th1, it is determined that the intersection detected ahead is a communication impeding intersection and the subroutine in FIG. 7 is then executed. In step 230 it may further be determined whether the distance from the intersecting vehicle to the intersection ahead is within a predetermined distance (i.e., within a distance less than a distance beyond which communication is not possible).

FIG. 7 is a flowchart illustrating one example of a subroutine executed when a communication impeding intersection is detected ahead.

When the subroutine shown in FIG. 7 starts, first in step 300, a process starts for i) generating communication impeding intersection information indicating the presence of a communication impeding intersection having at least a communication blocking object on the near side of the intersection, ii) generating additional information relating to the running information of the intersecting vehicle based on the data transmitted from the intersecting vehicle, and transmitting the communication impeding intersection information and the additional information to trailing vehicles and oncoming vehicles. In this case, only the additional information relating to the running state of the intersecting vehicle approaching the communication impeding intersection may be added to the data generated by the host vehicle, as described above, or, in addition to that additional information, the ID code of the vehicle targeted for transmission (a trailing vehicle or an oncoming vehicle) and the communication impeding intersection information may also be added to the data generated by the host vehicle. Information relating to the location of the communication impeding intersection, in addition to the information relating to the type of communication impeding intersection, may be included in the communication impeding intersection information. Also, when there are no trailing vehicles or oncoming vehicles on the road (e.g., when trailing vehicles B1 to B3 or oncoming vehicle C1 on road X are not present when assuming the host vehicle to be vehicle A in FIG. 4), the data in which the communication impeding intersection and the additional information is not included (see FIG. 2) may be regularly transmitted until the trailing vehicles or the oncoming vehicle appears.

In step 310 a process is carried out to update the additional information and communication impeding intersection information added to the data every time the host vehicle receives data from the intersecting vehicle, and transmit the data including the latest additional information and communication impeding intersection information. Here, the communication impeding intersection is updated because the presence of the communication blocking object dynamically changes when the communication blocking object is a mobile object, as described above. The process in step 310 continues at least until the host vehicle reaches the communication impeding intersection.

In step 320, a process is performed to determine whether the host vehicle has driven straight through the communication impeding intersection. This determination as to whether the host vehicle has driven straight through the intersection, or turned left or right or the like, can be made based on the change in the running vector of the host vehicle, information from the navigation system 26, and steering angle information from a steering angle sensor, and the like. If it has been determined that the host vehicle has not driven straight through the communication impeding intersection, then it is not possible to evaluate the presence of a communication blocking object on the far side of the communication impeding intersection so step 330 is executed. In step 330, the communication impeding intersection information is linked to the intersection through which the host vehicle passed and stored (preferably that information is linked to the map data from the navigation system 26 and stored), after which the subroutine ends, returning back to the main routine in FIG. 5. If the host vehicle has driven straight through the communication impeding intersection, on the other hand, step 340 and step 350 are executed to evaluate the presence of a communication blocking object on the far side of the communication impeding intersection.

In step 340, a process is performed similar to that in step 310 while monitoring the reception state of data transmitted from an intersecting vehicle in order to evaluate the presence of the communication blocking object on the far side of the communication impeding intersection. If there is no longer an intersecting vehicle on the intersecting road due to time having passed, (for example, if the intersecting vehicle changed direction from one approaching the intersection to one leading away from the intersection, or if the intersecting vehicle turned off of the intersecting road onto another road (e.g., vehicle D3 (t2) in FIG. 4), the additional information is not added to the data so the other vehicle that has received that data is able to recognize the fact that there is no approaching vehicle on the intersecting road.

In step 350, a process is performed to determine whether the reception state of the data transmitted from the intersecting vehicle has changed within a predetermined distance (or time) after passing through the intersection. In step 350, when reception of the data transmitted from an intersecting vehicle within a predetermined distance (such as 200 m) of the vehicle after passing through the intersection is interrupted (for example, when the data is not received for a predetermined period of time), step 360 is executed. In step 360, the communication impeding intersection information is updated to indicate a communication impeding intersection having communication blocking objects both on the near and far sides of the intersection and that information is then stored, and the updating and transmitting process for the data including the additional information and the like ends (due to the fact that the additional information cannot be updated). The subroutine is then ends, returning back to the main routine in FIG. 5. However, when an oncoming vehicle having a new ID code is confirmed ahead when the vehicle is running thereafter, the data including the latest communication impeding intersection information may be transmitted to the oncoming vehicle. In this case, the oncoming vehicle is able to recognize in advance the presence of the communication impeding intersection having communication blocking objects both on the near and far sides of the intersection. Further, the latest communication impeding intersection information may also be sent to a trailing vehicle by adding that information together with the ID code for the trailing vehicle. As a result, even a trailing vehicle that will not pass through the intersection (such as a trailing vehicle that turns left), can be made aware of, and store information relating to, the presence of the communication blocking object on the far side of the communication impeding intersection that it cannot detect itself.

Figure 8:
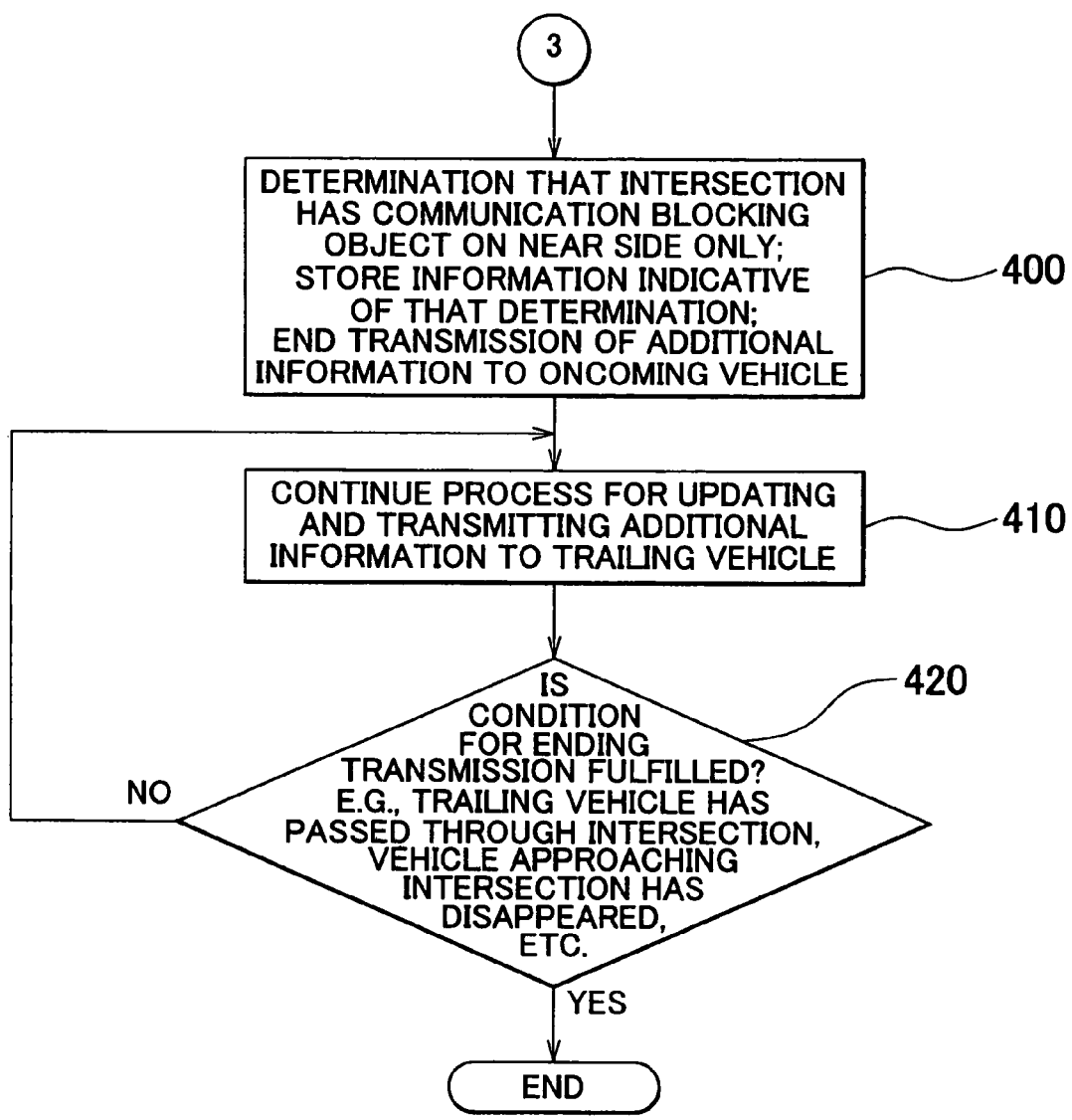
FIG. 8 is a flowchart illustrating one example of a subroutine executed when there are no radio-wave blocking objects on the far side of the communication impeding intersection.
Figure 4:
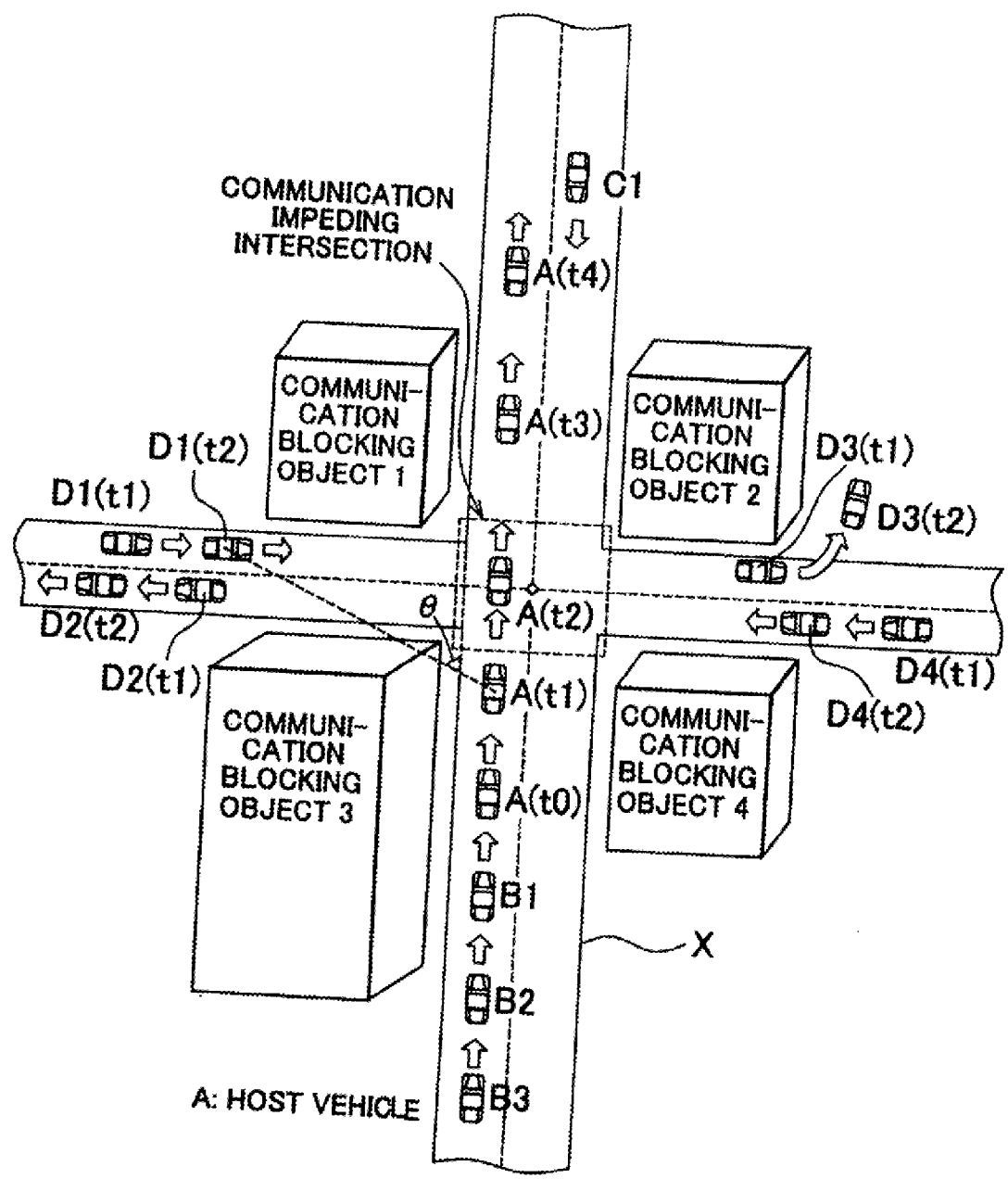
Figure 4:
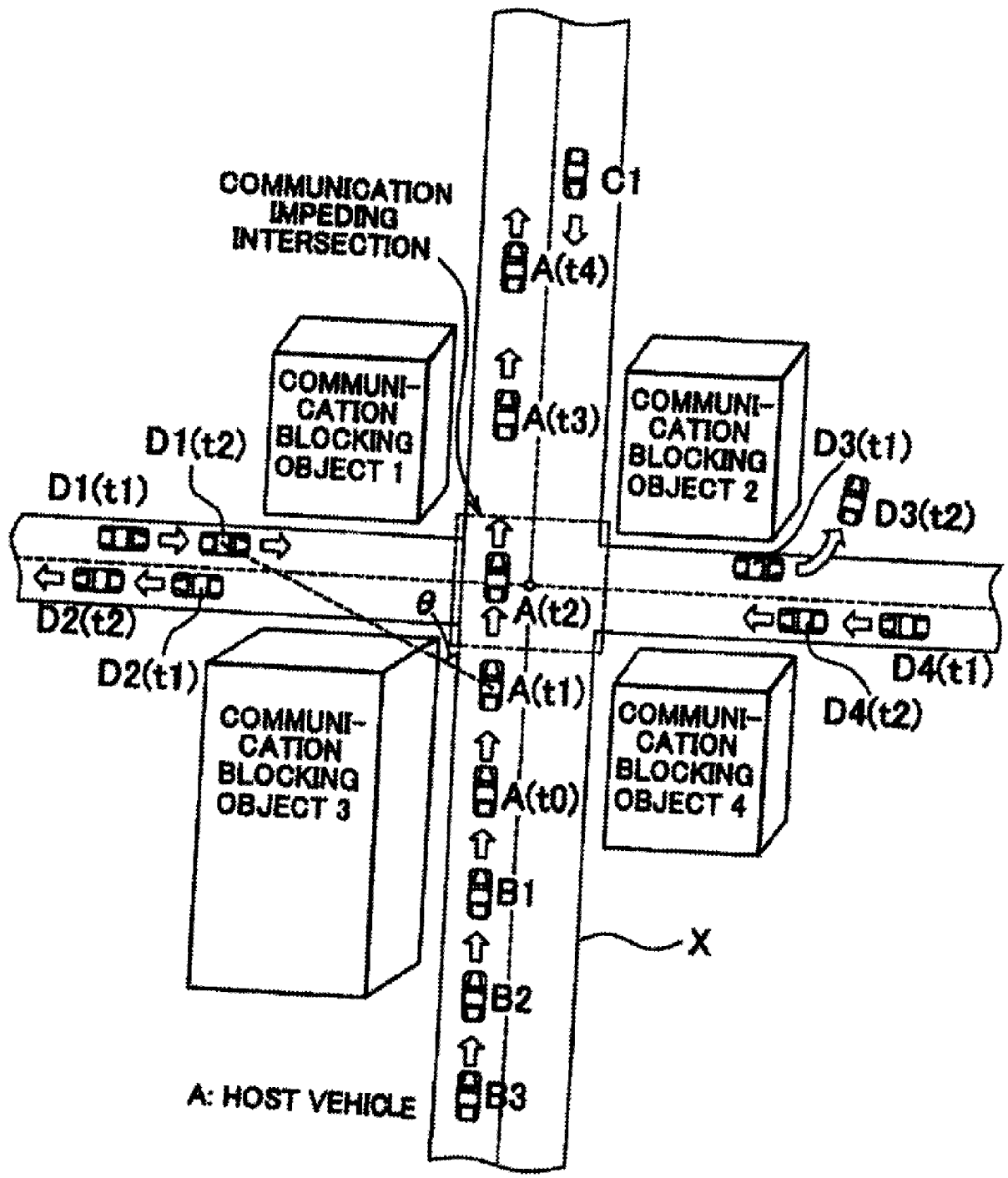

On the other hand in step 350, if reception of the data transmitted from an intersecting vehicle continues as before even after passing through the intersection and even after driving a predetermined distance, it is determined that there is no communication blocking object on the far side of the intersection. In this case, the subroutine in FIG. 8 is then executed. FIG. 8 is a flowchart illustrating one example of a subroutine executed when there are no communication blocking objects on the far side of a communication impeding intersection.

When the subroutine shown in FIG. 8 starts, first at step 400, a process is performed to update the communication impeding intersection information to indicate a communication impeding intersection having a communication blocking object only on the near side of the intersection and store the updated information. Also, in step 400, a process is performed to end transmission of the data including the additional information to the oncoming vehicle. Transmission of the data including the ID code of the oncoming vehicle may also end at the point when the oncoming vehicle and the host vehicle pass one another (this is because the oncoming vehicle is then able to receive data from an intersecting vehicle at least after that point).

In step 410, the data including the additional information, which is transmitted to the oncoming vehicle, continues to be updated and transmitted. Accordingly in this case, the ID code of the trailing vehicle, together with the communication impeding intersection information, is included in the data generated by the host vehicle, and only the latest additional information relating to the running state of the intersecting vehicle approaching the communication impeding intersection is added to that generated data. The process in step 410 is performed until another end condition of the data including the additional information is fulfilled in step 420. This end condition may be fulfilled, for example, when a trailing vehicle reaches the communication impeding intersection, when an intersecting vehicle that is approaching the communication impeding intersection disappears, or when the host vehicle is far enough away from the trailing vehicle that communication is no longer possible. When the end condition is fulfilled in step 420, the subroutine ends, returning back to the main routine shown in FIG. 5.

The processes shown in FIGS. 5 to 8 relate to processes where the host vehicle detects the communication impeding intersection on its own and evaluates the presence of a communication blocking object at the communication impeding intersection. When the host vehicle obtains the communication impeding intersection information relating to an intersection ahead from another vehicle, or when the communication impeding intersection information relating to an intersection ahead is stored beforehand in the host vehicle, however, updating and transmitting of the communication impeding intersection information and additional information can be performed when the host vehicle itself receives data from an intersecting vehicle by performing the processes in step 240 onward. At this time, until the host vehicle itself receives the data transmitted from the intersecting vehicle, the communication impeding intersection information and the additional information obtained from other vehicles is incorporated in the data to be sent to trailing vehicles and the like, and also used by the various types of other systems 18 using information obtained from vehicle-to-vehicle communication in the host vehicle.

As described above, according to the exemplary embodiment, it is possible to be made aware of the presence of an intersection with poor visibility (i.e., a communication impeding intersection) where vehicle-to-vehicle communication is important, as well as the presence of a communication blocking object at the communication impeding intersection, from a change in the reception state of data transmitted from an intersecting vehicle. Therefore, according to the exemplary embodiment, because it is possible to detect the presence of a communication impeding intersection where vehicle-to-vehicle communication will actually be impeded, as well as the presence of a communication blocking object at the communication impeding intersection, it is possible to effectively support safe driving at the communication impeding intersection with the minimum necessary information with the minimum frequency necessary. As a result, the exemplary embodiment both reduces the processing load on the receiving side and improves the usability of vehicle-to-vehicle communication. Further, because the various information relating to the communication impeding intersection is transmitted between vehicles and updated before each transmission, the latest information, which is highly reliable, can be used.

Next, a modified embodiment of the invention will be described. The data management ECU 16 according to this modified embodiment evaluates the likelihood of a collision between an intersecting vehicle and the host vehicle based on the history of the information relating to the position of the intersecting vehicle and the history of the information relating to the position of the host vehicle included in the data transmitted to the intersecting vehicle. The data management ECU 16 then determines the urgency level of vehicle-to-vehicle communication according to the likelihood of collision. When the difference between an estimated time until the intersecting vehicle reaches the intersection and an estimated time until the host vehicle reaches the intersection is within a predetermined range, that value is made the urgency level. This urgency level is set so as to increase as the estimated time decreases. Accordingly, the urgency level is set to the highest value when the estimated time until the host vehicle reaches the intersection is extremely short (i.e., right before the intersection). In this case, the location of the intersection may either be the location where the running vectors of the intersecting vehicle and the host vehicle intersect, or it may be the location of the intersection obtained from the map data of the navigation system 26.

When the data management ECU 16 according to the modified embodiment detects the sudden start of communication between the host vehicle and a intersecting vehicle by a method similar to that described in the foregoing embodiment, the data management ECU 16 determines the urgency level based on information obtained from that sudden communication, and determines whether the urgency level is greater than a predetermined threshold value. When the difference between the estimated time until the host vehicle reaches the intersection and the estimated time until the intersecting vehicle reaches the intersection is kept within a predetermined range, the urgency level increases as the vehicle approaches the intersection. Therefore, when the vehicle passes through an intersection that is not a communication impeding intersection, the urgency level is determined a sufficient distance before the intersection so the initially determined urgency level is relatively low. On the other hand, when the vehicle is passing through a communication impeding intersection, the urgency level is determined right before the communication impeding intersection so the initially determined urgency level is high. Therefore, according to the modified embodiment, it is possible to detect the presence of a communication impeding intersection by evaluating the urgency level which is determined based on information obtained from sudden communication with an intersecting vehicle. This modified embodiment may also be realized in combination with the foregoing exemplary embodiment.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

For example, in the exemplary embodiment, the functions of the signal processing unit 12 and the outgoing/incoming data buffer 12A may be incorporated into the gateway unit 14, the data management ECU 16, or the transceiver 10. Further, the function of the data management ECU 16 may also be realized by another ECU.

Also in the exemplary embodiment, the intersection shown in FIG. 4 is an intersection in which two roads intersect (a crossroads intersection). The invention, however, is not limited to this. That is, the invention may also be applied to an intersection in which three or more roads intersect (such as a T-shaped intersection).

Further, in the exemplary embodiment, communication impeding intersection information and additional information may be generated and processed for each communication impeding intersection when there are a plurality of communication impeding intersections one after another at relatively short intervals. In this case, the above-described process flows for each of the communication impeding intersections are simultaneously carried out (see FIGS. 5 to 8).

Moreover, when the vehicle has entered a roadside-to-vehicle communication zone (i.e., a zone in which there is a roadside-to-vehicle communication system), information can be obtained from roadside monitoring equipment located at an intersection while the process flows are being carried out. The obtained information may also be used. Also, even if the vehicle drives out of the vehicle-to-system communication zone, the information obtained while in the zone can still be transmitted to an oncoming vehicle.

Further, in the exemplary embodiment, even when the intersecting vehicle is a pedestrian or a bicycle or the like, as long as a communication terminal which at least has a transmission function and is carried by the pedestrian or bicycle or the like is in operation, it is similarly also possible to add information relating to the moving state of the pedestrian or bicycle or the like on the intersecting road to the data. In this case, taking into consideration the fact that the pedestrian or bicycle or the like can run out into the road or change direction more suddenly and easily than can a vehicle, even when the pedestrian or bicycle or the like is stopped or traveling away from the intersection, it is preferable to always add information relating to the moving state of the pedestrian or bicycle or the like.

This invention as described above displays the following effects. That is, the invention is able to provide necessary information in an efficient volume, and improve the usability of bi-directional communication without increasing the load on the receiving side at an intersection at which there is a concentration of communication blocking objects.

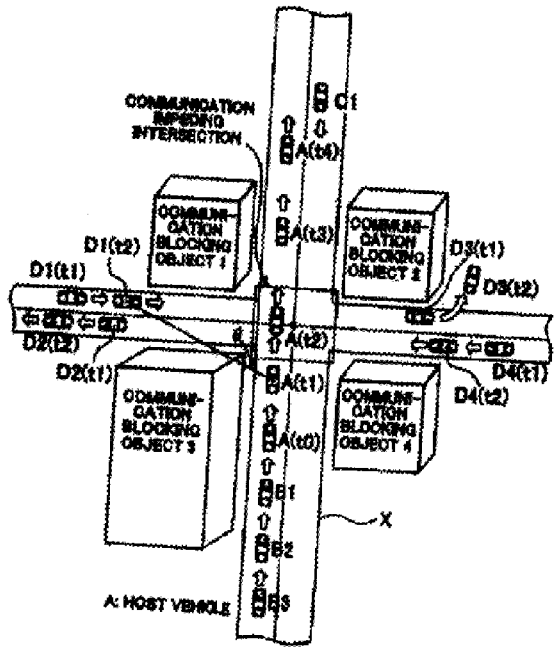

What is claimed is:

1. A driving support system for a vehicle, comprising:
   a communication apparatus enabling bi-directional communication between the vehicle and a first moving object, said communication apparatus obtaining at least one of i) communication impeding intersection information relating to a communication impeding intersection at which there is a radio-wave blocking object, and ii) moving object information relating to the first moving object, which is on an intersecting road that intersects a road on which the vehicle is traveling, by communication between the vehicle and the first moving object, that is traveling on the intersecting road, said communication apparatus transmitting to a second moving object that is on the road on which the vehicle is traveling, at least one of the communication impeding intersection information and the moving object information; and
   a detection device which detects the presence of the communication impeding intersection using at least one of the communication impeding intersection information and the moving object information,
   wherein said communication apparatus transmits to the second moving object only when the presence of the communication impeding intersection has been detected.

2. The driving support system according to claim 1, wherein said detection device detects the presence of the communication impeding intersection based on a communication history between the vehicle and the first moving object.

3. The driving support system according to claim 1, wherein said detection device detects the presence of the communication impeding intersection when communication between the vehicle and the first moving object, which is within a predetermined distance from the vehicle, starts while communication between the vehicle and only the second moving object is taking place.

4. The driving support system according to claim 3, further comprising a vehicle selecting device which i) monitors the communication state after communication has started between the vehicle and the first moving object when a plurality of the moving objects are traveling on the road on which the vehicle is traveling, and ii) selects from among the plurality of the moving objects the second moving object as a transmission target according to the monitoring results.

5. The driving support system according to claim 4, wherein when communication between the vehicle and the first moving object continues after the vehicle has passed through the communication impeding intersection, the second moving object that has not passed through the communication impeding intersection but which is behind and traveling in the same direction as the vehicle is the transmission target.

6. The driving support system according to claim 4, wherein when communication between the vehicle and the first moving object continues after the vehicle has passed through the communication impeding intersection, the second moving object which is behind and traveling away from the vehicle is excluded from being the transmission target.

7. The driving support system according to claim 1, wherein said detection device detects the presence of the communication impeding intersection when the distance between i) the vehicle at the time communication with the first moving object started and ii) a point of intersection of the intersecting road and the road on which the vehicle is traveling is less than a predetermined distance.

8. The driving support system according to claim 1, wherein said communication apparatus transmits the moving object information including only information relating to the first moving object that is approaching the communication impeding intersection to the second moving object.

9. The driving support system according to claim 8, wherein said communication apparatus transmits the moving object information including only information relating to the first moving object that has moved a predetermined distance or more away from the communication impeding intersection to the second moving object.

10. The driving support system according to claim 1, wherein said communication apparatus transmits the communication impeding intersection information including information relating to the location of the communication impeding intersection to the second moving object.

11. The driving support system according to claim 1, wherein said communication apparatus transmits the communication impeding intersection information including information relating to the presence of the radio-wave blocking object at the communication impeding intersection to the second moving object.

12. The driving support system according to claim 11, wherein said detection device evaluates the presence of the radio-wave blocking object based on a change in the communication state between the Wet vehicle and the moving object.

13. The driving support system according to claim 11, wherein said detection device evaluates the presence of the radio-wave blocking object based on the distance between i) the vehicle at the time communication with the first moving object ends, after the vehicle has passed through the communication impeding intersection, and ii) the communication impeding intersection.

14. The driving support system according to claim 1, wherein when the presence of the communication impeding intersection has been detected, the communication apparatus transmits to the second moving object at least one of the communication impeding intersection information and the moving object information only when there is not a traffic signal at the communication impeding intersection.

15. A driving support system for a vehicle comprising:
a receiving device that obtains at least one of communication impeding intersection information and moving object information of bi-directional communication between a first moving object and a second moving object; and
a transmitting device that transmits to a third moving object at least one of the communication impeding intersection information and the moving object information,
wherein the first moving object comprises a communication apparatus enabling bi-directional communication between the first moving object and the second moving object, said communication apparatus obtaining at least one of i) the communication impeding intersection information relating to a communication impeding intersection at which there is a radio-wave blocking object, and ii) the moving object information relating to the second moving object, which is on an intersecting road that intersects a road on which the first moving object is traveling, by communication between the first moving object and the second moving object that is traveling on the intersecting road, said communication apparatus transmitting to the vehicle object that is on the road on which the first vehicle is traveling at least one of the communication impeding intersection information and the moving object information, and a detection device which detects the presence of the communication impeding intersection using at least one of the communication impeding intersection information and the moving object information, said communication apparatus transmits to the vehicle only when the presence of the communication impeding intersection has been detected.

16. A driving support system comprising:
a receiving device that obtains information relating to presence of a radio-wave blocking object of bi-directional communication between a first moving object and a second moving object; and
a transmitting device which transmits to a third moving object information relating to the presence of the radio-wave blocking object,
wherein the first moving object comprises a communication apparatus enabling bi-directional communication between the first moving object and the second moving object, said communication apparatus obtaining at least one of i) the communication impeding intersection information relating to a communication impeding intersection at which there is a radio-wave blocking object, and ii) the moving object information relating to the second moving object, which is on an intersecting road that intersects a road on which the first moving object is traveling, by communication between the first moving object and the second moving object that is traveling on the intersecting road, said communication apparatus transmitting to the vehicle that is on the road on which the first vehicle is traveling at least one of the communication impeding intersection information and the moving object information, and a detection device which detects the presence of the communication impeding intersection using at least one of the communication impeding intersection information and the moving object information, said communication apparatus transmits to the vehicle only when the presence of the communication impeding intersection has been detected and transmits the communication impeding intersection information including information relating to the presence of the radio-wave blocking object at the communication impeding intersection to the vehicle.

17. A driving support system for a vehicle, comprising:
a detecting device which detects the presence of an intersection ahead on a road on which a vehicle is traveling based on predetermined map data;
a receiving device which is provided in a communication apparatus enabling bi-directional communication between the vehicle and a first moving object, said receiving device obtaining information by communication with the first moving object, which is on an intersecting road which intersects the road on which the vehicle is traveling at the intersection;
an information generating device that generates at least one of intersection information relating to the intersection and moving object information relating to the first moving object based on the obtained information; and
a transmitting device that transmits the generated information to a second moving object, which is on the road on which the vehicle is traveling when the intersection has been detected by the detecting device.

18. The driving support system according to claim 17, wherein the generated information is transmitted to the second moving object only when it has been detected that there is a facility of a predetermined scale or larger around the detected intersection based on the predetermined map data.

19. The driving support system according to claim 17, wherein only information relating to the first moving object that is in a predetermined position with respect to a facility of a predetermined scale or larger is included in the moving object information.

20. A vehicular control system provided in a vehicle, comprising:
a receiving device for receiving at least one of communication impeding intersection information and moving object information of bi-directional communication between a first moving object and a second moving object; and
a control apparatus that controls the vehicle using the received information,
wherein the first moving object comprises a communication apparatus enabling bi-directional communication between the first moving object and the second moving object, said communication apparatus obtaining at least one of i) the communication impeding intersection information relating to a communication impeding intersection at which there is a radio-wave blocking object, and ii) the moving object information relating to the second moving object, which is on an intersecting road that intersects a road on which the first moving object is traveling, by communication between the first moving object and the second moving object that is traveling on the intersecting road, said communication apparatus transmitting to the vehicle that is on the road on which the first vehicle is traveling at least one of the communication impeding intersection information and the moving object information, and a detection device which detects the presence of the communication impeding intersection using at least one of the communication impeding intersection information and the moving object information, said communication apparatus transmits to the vehicle only when the presence of the communication impeding intersection has been detected.

21. A vehicular control system provided in a vehicle, comprising:
   a receiving device for receiving information relating to presence of the a radio-wave blocking object at the communication impeding intersection of the bi-directional communication between a first moving object and a second moving object; and
   a control apparatus that controls the vehicle using the received information,
   wherein the first moving object comprises a communication apparatus enabling bi-directional communication between the first moving object and the second moving object, said communication apparatus obtaining at least one of i) the communication impeding intersection information relating to a communication impeding intersection at which there is a radio-wave blocking object, and ii) the moving object information relating to the second moving object, which is on an intersecting road that intersects a road on which the first moving object is traveling, by communication between the first moving object and the second moving object that is traveling on the intersecting road, said communication apparatus transmitting to the vehicle that is on the road on which the first vehicle is traveling at least one of the communication impeding intersection information and the moving object information, and a detection device which detects the presence of the communication impeding intersection using at least one of the communication impeding intersection information and the moving object information, said communication apparatus transmits to the vehicle only when the presence of the communication impeding intersection has been detected and transmits the communication impeding intersection information including information relating to the presence of the radio-wave blocking object at the communication impeding intersection to the vehicle.

* * * * *

UNITED STATES PATENT AND TRADEMARK OFFICE
CERTIFICATE OF CORRECTION

PATENT NO. : 7,133,768 B2
APPLICATION NO. : 10/770419
DATED : November 7, 2006
INVENTOR(S) : Yoshio Mukaiyama It is certified that error appears in the above-identified patent and that said Letters Patent is hereby corrected as shown below:

Title page should be deleted and substitute therefor the attached title page

Column 5, Line 39, change "exist" to --existing--;

Column 7, Line 27, delete the word "which";

Column 8, Line 56, delete the word "that";

Column 9, Line 3, delete the word "that";

Column 10, Line 52, after "control" change "systems" to --system--;

Column 17, Line 65, after "presence" add --of--;

Column 19, Line 44, change "vehicle B1 to B3" to --vehicles B1 to B3--;

Column 19, Line 53, after "side" add --of--;

Column 19, Line 64, after "side" add --of--;

Column 20, Line 49, change "determined" to --determine--;

Column 21, Line 40, change "orself-obtained" to --or self obtained--;

Column 22, Line 25, change "approaching vehicle" to --"approaching vehicle")--;

Column 24, Line 37, after "time" change "ti" to --t1--;

Column 28, Line 27, after "then" change "ends" to --ended--;

UNITED STATES PATENT AND TRADEMARK OFFICE
CERTIFICATE OF CORRECTION

PATENT NO. : 7,133,768 B2
APPLICATION NO. : 10/770419
DATED : November 7, 2006
INVENTOR(S) : Yoshio Mukaiyama It is certified that error appears in the above-identified patent and that said Letters Patent is hereby corrected as shown below:

Column 33, Line 2, change "the Wet vehicle and the moving" to --the vehicle and the first moving--;

Signed and Sealed this

Eighth Day of January, 2008

JON W. DUDAS
*Director of the United States Patent and Trademark Office*

United States Patent
Mukaiyama

(10) Patent No.: US 7,133,768 B2
(45) Date of Patent: Nov. 7, 2006

(54) VEHICULAR DRIVING SUPPORT SYSTEM AND VEHICULAR CONTROL SYSTEM

(75) Inventor: Yoshio Mukaiyama, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 330 days.

(21) Appl. No.: 10/770,419

(22) Filed: Feb. 4, 2004

(65) Prior Publication Data
US 2004/0158390 A1    Aug. 12, 2004

(30) Foreign Application Priority Data
Feb. 12, 2003    (JP) ............... 2003-033495

(51) Int. Cl.
*G01C 21/26* (2006.01)
*G01C 21/28* (2006.01)

(52) U.S. Cl. ............... 701/200; 701/301; 701/114; 340/901; 340/902; 340/903; 340/435

(58) Field of Classification Search ............... 701/200, 701/300, 301, 117, 33; 340/901, 902, 903, 340/905, 435, 436
See application file for complete search history.

(56) References Cited

U.S. PATENT DOCUMENTS

| | | | |
|---|---|---|---|
| 6,292,109 B1 * | 9/2001 | Murano et al. | 340/903 |
| 6,615,137 B1 * | 9/2003 | Lutter et al. | 701/301 |
| 6,625,540 B1 * | 9/2003 | Kageyama | 701/301 |
| 6,662,108 B1 * | 12/2003 | Miller et al. | 701/301 |
| 6,768,944 B1 * | 7/2004 | Breed et al. | 701/301 |
| 6,856,896 B1 * | 2/2005 | Kushida et al. | 701/207 |
| 2004/0128062 A1 * | 7/2004 | Ogino et al. | 701/200 |

FOREIGN PATENT DOCUMENTS

| | | |
|---|---|---|
| JP | A 4-290200 | 10/1992 |
| JP | A 11-352241 | 12/1999 |
| JP | A 2000-348299 | 12/2000 |
| JP | A 2000-357298 | 12/2000 |

* cited by examiner

*Primary Examiner*—Thomas Black
*Assistant Examiner*—Brian J. Broadhead
(74) *Attorney, Agent, or Firm*—Kenyon & Kenyon LLP

(57) ABSTRACT

A driving support system for a vehicle, which is provided with a communication apparatus capable of bi-directional communication between the vehicle and an unspecified number of moving objects, detects the presence of a communication impeding intersection at which there is a radio-wave blocking object using information obtained by communication with at least one of the moving objects that is traveling on an intersecting road which intersects the road on which the vehicle is traveling. The driving support system then transmits to at least one of the moving objects on the road on which the vehicle is traveling at least one of communication impeding intersection information relating to the communication impeding intersection and moving object information relating to at least one of the moving objects that is on the intersecting road only when the presence of the communication impeding intersection has been detected.

21 Claims, 8 Drawing Sheets

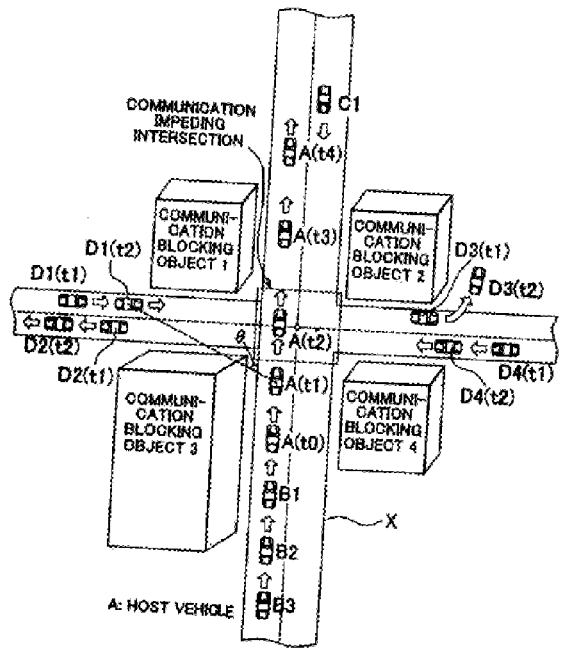

UNITED STATES PATENT AND TRADEMARK OFFICE
CERTIFICATE OF CORRECTION

PATENT NO. : 7,133,768 B2
APPLICATION NO. : 10/770419
DATED : November 7, 2006
INVENTOR(S) : Yoshio Mukaiyama It is certified that error appears in the above-identified patent and that said Letters Patent is hereby corrected as shown below:

Title page should be deleted and substitute therefor the attached title page

Delete the Drawing Sheet 4 of 8 and substitute therefor the attached Drawing Sheet 4 of 8.

Column 5, Line 39, change "exist" to --existing--;

Column 7, Line 27, delete the word "which";

Column 8, Line 56, delete the word "that";

Column 9, Line 3, delete the word "that";

Column 10, Line 52, after "control" change "systems" to --system--;

Column 17, Line 65, after "presence" add --of--;

Column 19, Line 44, change "vehicle B1 to B3" to --vehicles B1 to B3--;

Column 19, Line 53, after "side" add --of--;

Column 19, Line 64, after "side" add --of--;

Column 20, Line 49, change "determined" to --determine--;

Column 21, Line 40, change "orself-obtained" to --or self obtained--;

Column 22, Line 25, change "approaching vehicle" to --"approaching vehicle")--;

Column 24, Line 37, after "time" change "ti" to --t1--;

Column 28, Line 27, after "then" change "ends" to --ended--;

UNITED STATES PATENT AND TRADEMARK OFFICE
CERTIFICATE OF CORRECTION

PATENT NO. : 7,133,768 B2
APPLICATION NO. : 10/770419
DATED : November 7, 2006
INVENTOR(S) : Yoshio Mukaiyama It is certified that error appears in the above-identified patent and that said Letters Patent is hereby corrected as shown below:

Column 33, Line 2, change "the Wet vehicle and the moving" to --the vehicle and the first moving--;

This certificate supersedes the Certificate of Correction issued January 8, 2008.

Signed and Sealed this

Twenty-ninth Day of January, 2008

JON W. DUDAS
*Director of the United States Patent and Trademark Office*

(12) United States Patent
Mukaiyama

(10) Patent No.: US 7,133,768 B2
(45) Date of Patent: Nov. 7, 2006

(54) VEHICULAR DRIVING SUPPORT SYSTEM AND VEHICULAR CONTROL SYSTEM

(75) Inventor: Yoshio Mukaiyama, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 330 days.

(21) Appl. No.: 10/770,419

(22) Filed: Feb. 4, 2004

(65) Prior Publication Data
US 2004/0158390 A1 Aug. 12, 2004

(30) Foreign Application Priority Data
Feb. 12, 2003 (JP) ............... 2003-033495

(51) Int. Cl.
G01C 21/26 (2006.01)
G01C 21/28 (2006.01)

(52) U.S. Cl. ............... 701/200; 701/301; 701/114; 340/901; 340/902; 340/903; 340/435

(58) Field of Classification Search ............... 701/200, 701/300, 301, 117, 33; 340/901, 902, 903, 340/905, 435, 436
See application file for complete search history.

(56) References Cited

U.S. PATENT DOCUMENTS

| | | | |
|---|---|---|---|
| 6,292,109 B1 * | 9/2001 | Murano et al. | 340/903 |
| 6,615,137 B1 * | 9/2003 | Lutter et al. | 701/301 |
| 6,625,540 B1 * | 9/2003 | Kageyama | 701/301 |
| 6,662,108 B1 * | 12/2003 | Miller et al. | 701/301 |
| 6,768,944 B1 * | 7/2004 | Breed et al. | 701/301 |
| 6,856,896 B1 * | 2/2005 | Kushida et al. | 701/207 |
| 2004/0128062 A1 * | 7/2004 | Ogino et al. | 701/200 |

FOREIGN PATENT DOCUMENTS

| | | |
|---|---|---|
| JP | A 4-290200 | 10/1992 |
| JP | A 11-352241 | 12/1999 |
| JP | A 2000-348299 | 12/2000 |
| JP | A 2000-357298 | 12/2000 |

* cited by examiner

Primary Examiner—Thomas Black
Assistant Examiner—Brian J. Broadhead
(74) Attorney, Agent, or Firm—Kenyon & Kenyon LLP

(57) ABSTRACT

A driving support system for a vehicle, which is provided with a communication apparatus capable of bi-directional communication between the vehicle and an unspecified number of moving objects, detects the presence of a communication impeding intersection at which there is a radio-wave blocking object using information obtained by communication with at least one of the moving objects that is traveling on an intersecting road which intersects the road on which the vehicle is traveling. The driving support system then transmits to at least one of the moving objects on the road on which the vehicle is traveling at least one of communication impeding intersection information relating to the communication impeding intersection and moving object information relating to at least one of the moving objects that is on the intersecting road only when the presence of the communication impeding intersection has been detected.

21 Claims, 8 Drawing Sheets